United States Patent
Ise

(10) Patent No.: US 10,595,263 B2
(45) Date of Patent: Mar. 17, 2020

(54) COMMUNICATION APPARATUS SWITCHING COMMUNICATION ROUTE, CONTROL METHOD FOR COMMUNICATION APPARATUS AND STORAGE MEDIUM

(71) Applicant: CANON KABUSHIKI KAISHA, Tokyo (JP)

(72) Inventor: Yasuaki Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/127,654

(22) Filed: Sep. 11, 2018

(65) Prior Publication Data

US 2019/0082375 A1    Mar. 14, 2019

(30) Foreign Application Priority Data

Sep. 14, 2017 (JP) .................. 2017-176880

(51) Int. Cl.
*H04W 40/20* (2009.01)
*H04W 16/28* (2009.01)

(52) U.S. Cl.
CPC ......... *H04W 40/205* (2013.01); *H04W 16/28* (2013.01)

(58) Field of Classification Search
CPC ............................ H04W 40/205; H04W 16/28
See application file for complete search history.

(56) References Cited

U.S. PATENT DOCUMENTS

| 7,805,743 | B2 * | 9/2010 | Onomatsu | H04N 5/50 725/72 |
| 8,208,859 | B2 * | 6/2012 | Yamazaki | H01O 3/2605 455/63.4 |
| 10,368,257 | B2 * | 7/2019 | Hirayama | H04W 24/04 |
| 2006/0020987 | A1 * | 1/2006 | Onomatsu | H04N 5/4401 725/100 |

(Continued)

FOREIGN PATENT DOCUMENTS

JP    2006-148928 A    6/2006
JP    2010-171560 A    8/2010

*Primary Examiner* — Rasheed Gidado
(74) *Attorney, Agent, or Firm* — Cowan, Liebowitz & Latman, P.C.

(57) ABSTRACT

A communication apparatus aims to maintain directional communication even when a surrounding environment changes. The communication apparatus has a communication unit having a plurality of antenna elements and performs wireless communication with another communication apparatus by directional communication; an image pickup unit configured to shoot a surrounding environment; and a control unit. The communication unit controls directivity of the wireless communication being by changing phases or strengths of signals from the plurality of antenna elements. Before a communication route through which the communication unit is performing the wireless communication with the another communication apparatus is blocked, a switching candidate communication route is set based on a shot image of the surrounding environment shot, whereas if the communication route with the another communication apparatus is blocked, the directivity of the wireless communication by the communication unit is controlled to switch to the switching candidate communication route.

23 Claims, 18 Drawing Sheets

(56) References Cited

U.S. PATENT DOCUMENTS

| | | | |
|---|---|---|---|
| 2007/0216584 A1* | 9/2007 | Nishikido | H01Q 1/242 |
| | | | 343/702 |
| 2009/0238093 A1* | 9/2009 | Saneto | H04W 72/02 |
| | | | 370/253 |
| 2010/0099415 A1* | 4/2010 | Li | H04W 36/30 |
| | | | 455/436 |
| 2018/0053998 A1* | 2/2018 | Ashida | H01Q 1/246 |
| 2019/0052794 A1* | 2/2019 | Kikuchi | H04N 5/232411 |

* cited by examiner

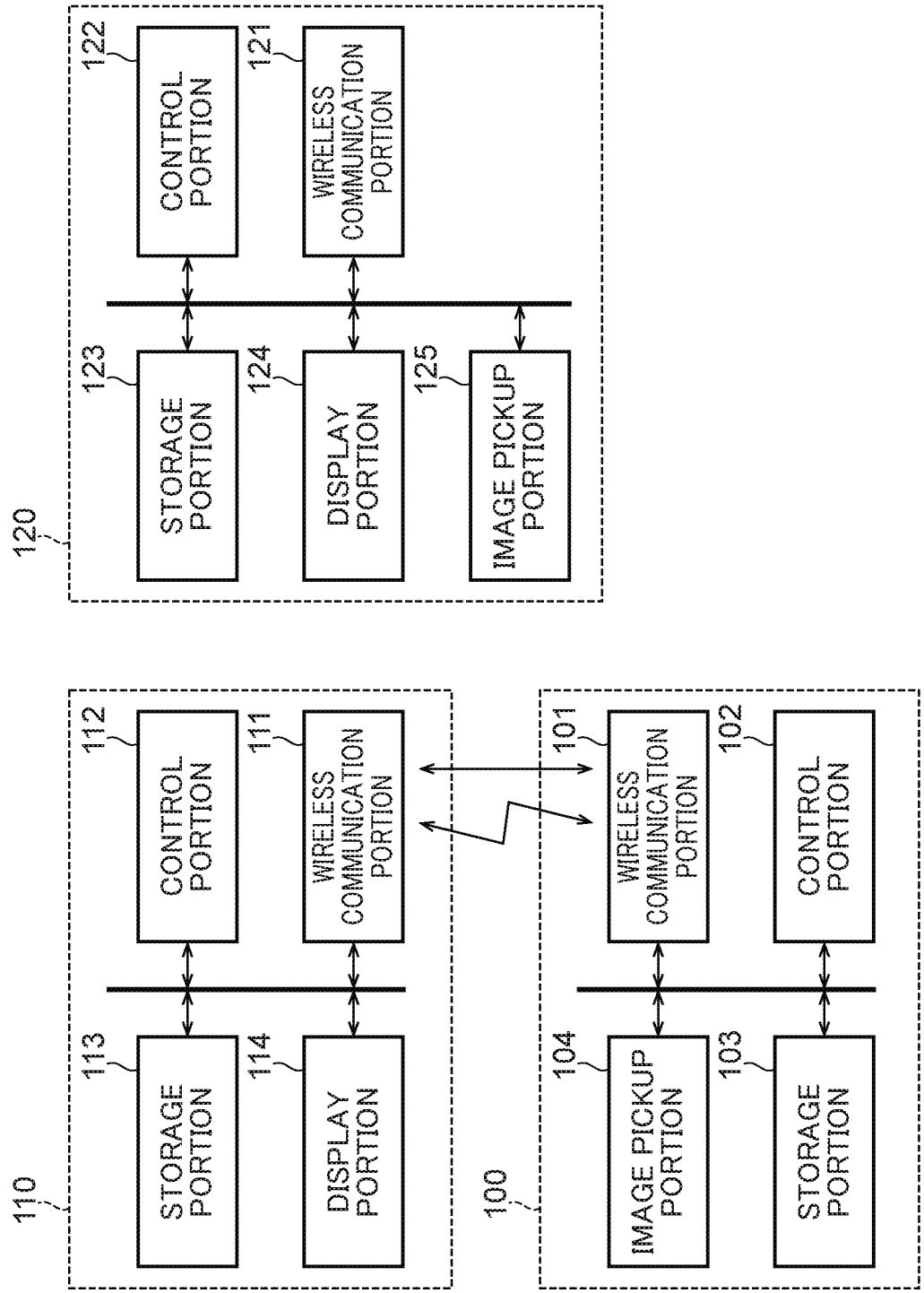

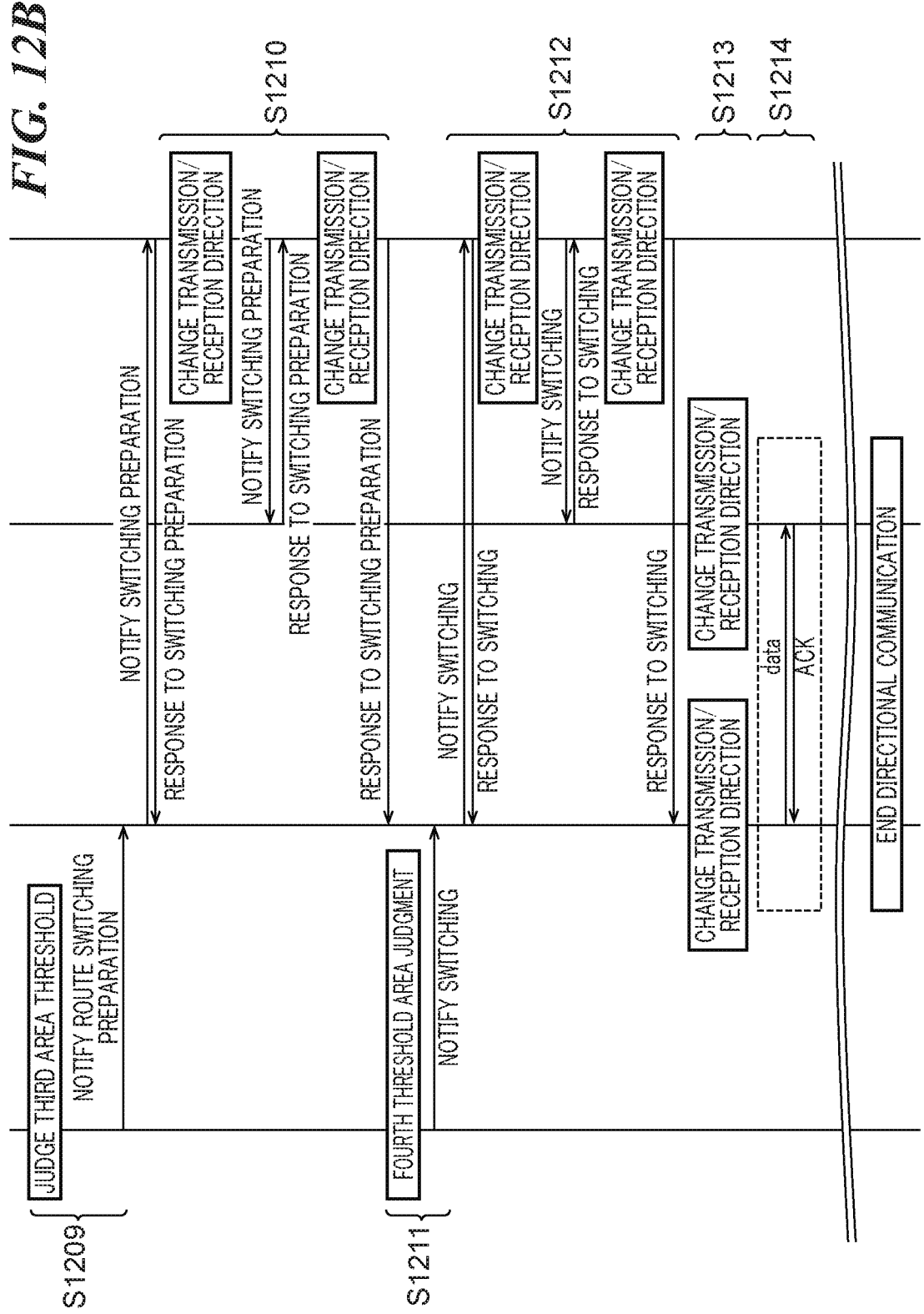

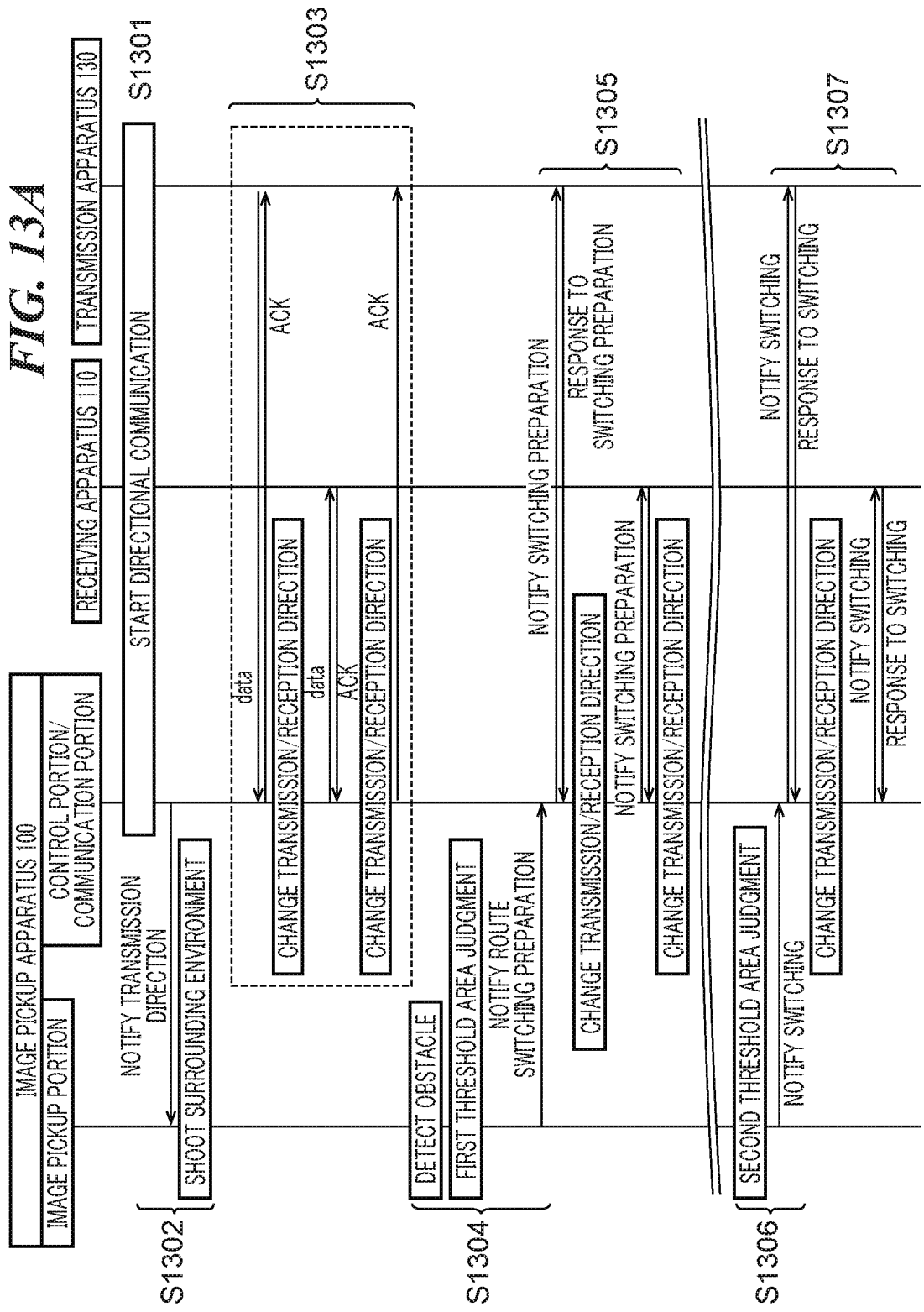

COMMUNICATION APPARATUS SWITCHING COMMUNICATION ROUTE, CONTROL METHOD FOR COMMUNICATION APPARATUS AND STORAGE MEDIUM

BACKGROUND OF THE INVENTION

Field of the Invention

The present invention relates to a communication apparatus switching a communication route, a control method for the communication apparatus, and a storage medium.

Description of the Related Art

Recently, a demand for higher speed data communication has been increasing, for example, to transmit/receive uncompressed video data. In order to respond to this demand, attention has been paid, for example, to communication by a millimeter wave band enabling broadband communication, and standards such as the IEEE802.15.3c standard and the IEEE802.11ad standard have been formulated. Since it is permitted to use a wide bandwidth for signal transmission on the millimeter wave band, the millimeter wave band is favorable for high speed communication. Electromagnetic waves of a millimeter wave band have a strong straightness, and there may be a case where communication is disconnected by a phenomenon called "shadowing" in which a significant decrease in signal strength is caused by an obstacle.

Japanese Laid-Open Patent Publication (Kokai) No. 2006-148928 discloses a communication system in which not only a communication path using a direct wave but also a communication path using a reflected wave is searched out beforehand, and, when one communication path is blocked, another communication path is used, so that a communication failure does not easily occur. Japanese Laid-Open Patent Publication (Kokai) No. 2010-171560 discloses a data communication system in which a possibility of decrease in quality of wireless communication is detected in advance between a data transmitter and a data receiver so that a communication route is changed before data deterioration occurs.

As for the communication system of Japanese Laid-Open Patent Publication (Kokai) No. 2006-148928, it is feared that, since a communication path is switched to after one communication path is blocked, communication is temporarily disconnected. The data communication system of Japanese Laid-Open Patent Publication (Kokai) No. 2010-171560 has a problem that, when a surrounding environment changes because of a position of a communication apparatus itself having changed or the like, directional communication cannot be maintained even if it is tried to change a communication route, because a reflection path is not held beforehand.

SUMMARY OF THE INVENTION

The present invention has been made in view of the problems as described above, and aims to maintain directional communication even when a surrounding environment changes.

There is provided a communication apparatus a communication apparatus comprising: a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication; an image pickup unit configured to shoot a surrounding environment; and a control unit configured to, before a communication route through which the communication unit is performing the wireless communication with the another communication apparatus is blocked, set a switching candidate communication route based on a shot image of the surrounding environment shot by the image pickup unit, and, if the communication route through which the communication unit is performing the wireless communication with the another communication apparatus is blocked, control the directivity of the wireless communication by the communication unit to switch to the switching candidate communication route.

According to the present invention, it is possible to maintain directional communication even when a surrounding environment changes.

Further features of the present invention will become apparent from the following description of exemplary embodiments with reference to the attached drawings.

BRIEF DESCRIPTION OF THE DRAWINGS

FIG. 1 is a schematic view showing a configuration of a wireless communication system.

FIGS. 12A and 12B are flowcharts showing the process for switching a communication route.

FIGS. 13A and 139 are flowcharts showing a process for switching a communication route.

DESCRIPTION OF THE EMBODIMENTS

Figures 2A, 2B:
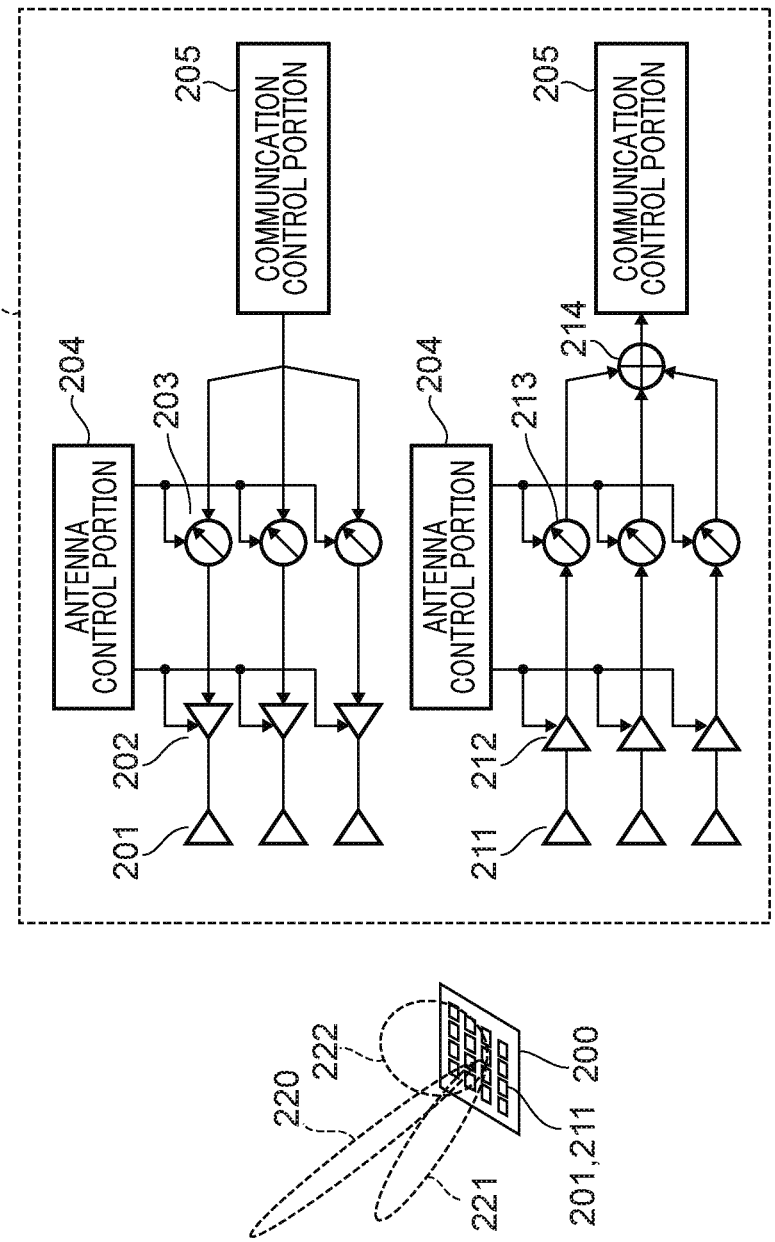
FIGS. 2A and 2B are views showing a configuration of a directional communication portion.

The present invention will now be described in detail below with reference to the accompanying drawings showing embodiments thereof.

First Embodiment

FIG. 1 is a schematic view showing an example of a configuration of a wireless communication system in the present embodiment.

The wireless communication system has an image pickup apparatus 100 as a first communication apparatus, such as a camera, a receiving apparatus 110 as a second communication apparatus, such as a television set, and a relay apparatus 120 as a third communication apparatus, such as a notebook PC. Each of the image pickup apparatus 100, the receiving apparatus 110, and the relay apparatus 120 is wirelessly communicable.

The image pickup apparatus 100 is provided with a wireless communication portion 101, a control portion 102, a storage portion 103, and an image pickup portion 104. The control portion 102 is responsible for control of the whole image pickup apparatus 100. The control portion 102 is, for example, a CPU, an MPU or the like. The storage portion 103 stores therein various pieces of data. The storage portion 103 has, for example, a nonvolatile memory, a RAM, and the like. The nonvolatile memory stores therein a process procedure of the control portion 102 (a program), various settings for the image pickup apparatus 100, GUI data for a menu screen, and the like. The RAM is used as a work area of the control portion 102.

The image pickup portion 104 has, for example, an image pickup device, an optical unit, drivers for driving the image pickup device and the optical unit, and the like. The image pickup device is, for example, a CCD image sensor or a CMOS image sensor. The optical unit has mainly lenses (a zoom lens, a focus lens and the like), an actuator for driving the lenses, and the like. The driver controls the optical unit under the control of the control portion 102. The image pickup portion 104 can shoot an object in an optical axis direction and can shoot a surrounding environment (a surrounding situation) by setting a zoom function to a wide angle side.

The receiving apparatus 110 is provided with a wireless communication portion 111, a control portion 112, a storage portion 113, and a display portion 114. The control portion 112 is responsible for control of the whole receiving apparatus 110. The control portion 112 is, for example, a CPU, an MPU, or the like. The storage portion 113 stores therein various pieces of data. The storage portion 113 has, for example, a nonvolatile memory, a RAM, and the like. The nonvolatile memory stores therein a process procedure of the control portion 112 (a program), various settings for the receiving apparatus 110, GUI data for a menu screen, and the like. The RAM is used as a work area of the control portion 112. A video signal received by the control portion 112 is decoded, and stored into the storage portion 113 or directly displayed on the display portion 114. It should be noted that the receiving apparatus 110 is not limited to a case of being a television set but may be, for example, a tablet terminal, a notebook PC, a video projecting apparatus such as a projector, a digital camera or mobile electronic equipment such as a smartphone.

The relay apparatus 120 is provided with a wireless communication portion 121, a control portion 122, a storage portion 123, a display portion 124, and an image pickup portion 125. The control portion 122 is responsible for control of the whole relay apparatus 120. The control portion 122 is, for example, a CPU, an MPU or the like. The storage portion 123 stores therein various pieces of data. The storage portion 123 has, for example, a nonvolatile memory and a RAM. The nonvolatile memory stores therein a process procedure of the control portion 122 (a program), various settings for the relay apparatus 120, GUI data for a menu screen, and the like. The RAM is used as a work area of the control portion 122. The image pickup portion 125 can shoot an object in an optical axis direction and can shoot a surrounding environment (a surrounding situation) by setting a zoom function to a wide angle side. It should be noted that the relay apparatus 120 may not have the image pickup portion 125.

Each of the wireless communication portions 101, 111 and 121 has a directional communication portion and an omni-directional communication portion. The omni-directional communication portion has, for example, a wireless communication function in conformity with a wireless communication standard such as Wi-Fi (registered trademark) and Bluetooth (registered trademark) and performs wireless communication with external equipment on a wireless communication network. The directional communication portion performs directional wireless communication using a millimeter wave band in the IEEE802.15.3c standard and the IEEE802.11ad standard. A communication rate of the directional communication is higher in comparison with omni-directional communication. However, there may be a case where, when a communication route is blocked by an obstacle or the like, the communication rate extremely decreases.

FIGS. 2A and 2B are diagrams showing an example of a configuration of the directional communication portion between the wireless communication portions.

A chip antenna module 200 can be used for the directional communication portion. Further, an antenna array module can be applied to the chip antenna module 200. As shown in FIG. 2A, a plurality of antenna elements 201 of a directional transmission antenna and a plurality of antenna elements 211 of a directional receiving antenna are arranged in the chip antenna module 200. As shown in FIG. 2B, the directional communication portion further has communication control portions 205, antenna control portions 204, and the like. The directional communication portion may have a memory and the like. The control portion 102 generates a control signal for controlling the antenna elements 201 and 211. It should be noted that the directional communication portion is not limited to the case of having the directional transmission antenna and the directional receiving antenna separately. One antenna may be used as the directional transmission antenna and the directional receiving antenna. After an arbitrary phase shift is added to a signal, the signal passes through an amplifier 202 and is radiated via the directional transmission antenna (the antenna elements 201). By the control portion 102 changing the control signal to the antenna control portion 204, a phase shift amount and an amplification amount can be changed. Therefore, an antenna transmission pattern such as a radio wave radiation direction, a narrow or wide directivity, and the like can be controlled.

On the directional receiving antenna side, a signal propagated in free space is received by the directional receiving antenna (the antenna elements 211). The received signal is amplified by an amplifier 212. After that, a phase shift is added to the signal by a phase shifter 213, and addition is performed by an adder 214. The signal after the addition is outputted from the communication control portion 205 as a received signal. By the control portion 102 changing the control signal to the antenna control portion 204, a phase shift amount and an amplification amount for the received signal can be changed. Therefore, an antenna receiving pattern such as a reception direction, a narrow or wide directivity and the like can be controlled. It should be noted that it is possible to cause the directional transmission antenna or the directional receiving antenna as a wide directional antenna by performing transmission or receiving using only one antenna element.

FIG. 2A shows an example in which a transmission direction is changed by the directional transmission antenna. It should be noted that, hereinafter, a transmission orientation of the directional transmission antenna which a transmission apparatus 130 uses at the time of transmission will be referred to as a transmission direction, and a receiving orientation of the directional receiving antenna which the receiving apparatus 110 uses at the time of receiving will be referred to as a reception direction. When it is not necessary to distinguish between the transmission direction and the reception direction, the orientation will be referred to as a transmission/reception direction. In general, by setting directivity narrower, communication strength increases by a magnitude corresponding to the number of antenna elements for a transmission direction, and a communication distance becomes longer. On the other hand, when wide directivity is realized, communication strength decreases because the number of allocated antenna elements for a transmission direction decreases, and a communication distance becomes shorter. Therefore, the narrow directivity and communication distance increase in order of transmission directions 222, 221 and 220 shown in FIG. 24. Further, when reception directions do not correspond to arrival directions of signals propagated in free space, signals with different phases interfere with one another because phases of antenna elements of the directional receiving antenna do not correspond, and, therefore, sufficient sensitivity cannot be obtained. Therefore, in general, receiving sensitivity decreases by setting a reception direction of antenna elements wide for an arrival direction, and receiving strength can be increased by setting the reception direction narrow, similarly to the transmission direction.

It should be noted that the control portion 102 may make a matrix of relationships between phase shift amounts for the phase shifters 203 and 213 for a transmission/reception direction and amplification factors of the amplifiers 202 and 212 so as to perform operation each time. Further, the control portion 102 may store content of settings according to transmission/reception directions and directivity widths in the storage portion 103 as a lookup table (LUT). The control portion 102 can notify the antenna control portions 204 about setting values read front the LUT according to a determined transmission/reception direction and directivity width. Further, the control portion 102 may have a function of measuring a distance according to time required for signal transmission between the image pickup apparatus 100 and the receiving apparatus 110. The communication control portions 205 perform analog-digital conversion (ADC) and digital-analog conversion (DAC). Further, the communication control portion 205 has a function of acquiring communication quality of a received signal such as received signal strength and a data error rate, at the time of receiving the signal.

Figure 3:
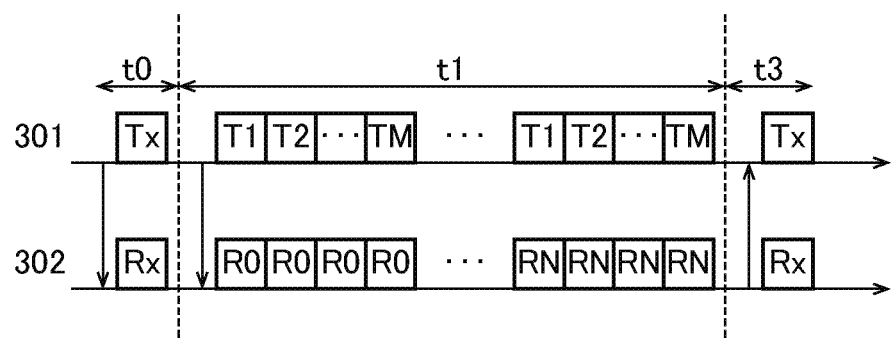
FIG. 3 is a timing chart which is useful in explaining a method for searching for transmission reception directions.

FIG. 3 is a timing chart which is useful n explaining a method for searching for a transmission direction and a reception direction in which directional communication becomes possible between transmission and receiving apparatuses.

In FIG. 3, the image pickup apparatus 100 that transmits image data is assumed to be a master 301, and the receiving apparatus 110 that receives the image data is assumed to be a slave 302. Here, all combinations of transmission and reception directions are searched for between the master 301 and the slave 302. The master 301 has a directional transmission antenna capable of switching the transmission direction among M stages. That is, the master 301 can change the number of angular steps in M ways. The slave 302 has a directional receiving antenna capable of switching the reception direction among N stages. That is, the slave 302 can change the number of angular steps in N ways. The master 301 and the slave 302 may have directional receiving antennas for each apparatus which are different in the number of angular steps.

As shown in FIG. 3, when a search for transmission and reception directions (a transmission/reception direction search) are started, transmission/reception direction search conditions are transmitted first in a period t0 by a wireless communication scheme which is currently selected. The transmission/reception direction search conditions include information about search order. When omni-directional communication is selected, the slave 302 is notified of the transmission/reception direction search conditions from the master 301 by the omni-directional communication. On the other hand, when directional communication is selected, the transmission/reception direction search conditions are transmitted from the master 301 to the slave 302 in a transmission direction Tx and a reception direction Rx which are currently selected. Next, in a period t1, the master 301 and the slave 302 search for a communicable communication route while changing the transmission direction and the reception direction, respectively. Here, there are M×N combinations of transmission/reception directions between the master 301 and the slave 302. In order specified by the transmission/reception direction search conditions, the slave 302 fixes a reception direction, and the master 301 transmits a radio signal while changing each transmission direction. When the master 301 completes transmission for all the number of steps, the slave 302 changes the reception direction and repeats receiving until transmission/receiving is completed for all the combinations. The slave 302 receives a radio signal while changing the reception direction and identifies a signal arrival direction as a reception direction. Next, in a period t3, the slave 302 notifies the master 301 of a combination of a transmission direction and a reception direction (a radio wave arrival direction) in which communication was enabled, in transmission/reception directions of omni-directional communication or directional communication which is communicable beforehand. Thus, the master 301 can acquire information about a communicable communication route.

Next, returning to the configuration of the image pickup apparatus 100, a configuration of the image pickup portion 104 will be further described.

Figure 4:
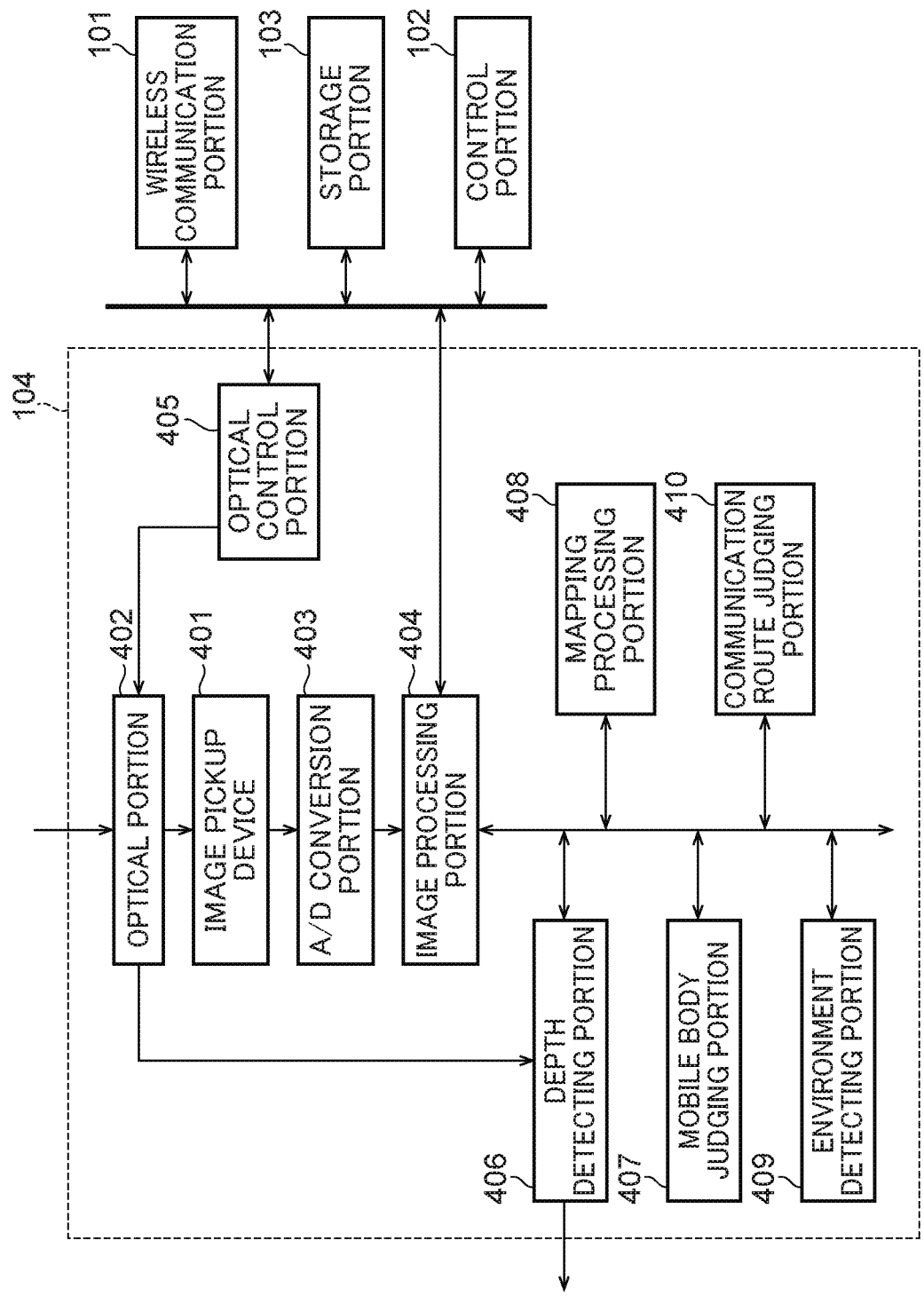
FIG. 4 is a view showing a configuration of an image pickup portion.

FIG. 4 is a view showing an example of the configuration of the image pickup portion 104.

The image pickup portion 104 has an image pickup device 401, an optical portion 402, an A/D conversion portion 403, an image processing portion 404, an optical control portion 405, a depth detecting portion 406, a moving body judging portion 407, a mapping processing portion 408, an environment detecting portion 409, a communication route judging portion 410, and the like. It should be noted that the depth detecting portion 406, the moving body judging portion 407, the mapping processing portion 408, the environment detecting portion 409 and the communication route judging portion 410 are not limited to being a part of the image pickup portion 104, but may be configured independently of the image pickup portion 104. They may be included in a part of the control portion 102. The image pickup device 401 converts an object image formed via the optical portion 402 to an electrical signal. The A/D conversion portion 403 converts the analog signal generated by the image pickup device 401 to a digital signal. The image processing portion 404 converts the digital signal obtained by conversion by the A/D conversion portion 403 to image data. The optical control portion 405 controls the optical portion 402.

The depth detecting portion 406 detects depth information about a surrounding environment which is an object. The depth detecting portion 406 corresponds to an example of a depth detecting unit. The depth detecting portion 406 causes the detected depth information to be three-dimensional data almost simultaneously with a shot image, in a manner that the same image pickup range is obtained. The three-dimensional data is, for example, a grayscale image which includes brightness distribution according to a depth of each pixel. The depth information is indicated, for example, by making brightness of a pixel high if depth of the pixel (a distance to an object) is deep based on a certain reference position. The depth detecting portion 406 stores the depth information into the storage portion 103 in association with a shot image (real image data). It should be noted that, as a method for detecting the depth information, well-known techniques of "an approach for generating a depth map by a stereo camera" and "a TOF (Time of Flight) approach utilizing infrared light" can be used. Otherwise, techniques of "an approach utilizing a reflection pattern of infrared light", "an approach for generating a depth map from a motion vector", and the like can be used. Further, by being provided with, for example, an infrared radiation unit, an image pickup device having spectral characteristics including those of infrared light, and an optical filter, the image pickup portion 104 may perform detection of a regular shot image and infrared light with the same image pickup device.

The moving body judging portion 407 judges a moving body (including an obstacle) moving in a specified area of a shot image and detects a motion vector (a movement direction and a movement amount) of the moving body. The moving body judging portion 407 corresponds to an example of a moving body detecting unit. The moving body judging portion 407 can judge a moving body in a plurality of areas, and it detects a motion vector of the moving body in each area. The mapping processing portion 408 performs mapping of a surrounding environment. Specifically, the mapping processing portion 408 generates two-dimensional data (x-z plane/y-z plane) or three-dimensional data of the surrounding environment from a shot image (an x-y direction) and depth information (a z direction). The generated data is geometric information stereoscopically representing the surrounding environment. The mapping processing portion 408 stores the generated two-dimensional data or three-dimensional data of the surrounding environment into the storage portion 103.

The environment detecting portion 409 detects a reflection surface that causes a radio signal to be reflected, based on the shot image and depth information stored in the storage portion 103. The environment detecting portion 409 corresponds to an example of a reflection surface detecting unit. Specifically, the environment detecting portion 409 extracts a contrast evaluation value and an AE evaluation value from the shot image, and a plane area to be the reflection surface from the depth information. At this time, the environment detecting portion 409 extracts, based on a position to be a candidate for the reflection surface, which has been notified from the communication route judging portion 410 to be described later, a plane area around the position. The environment detecting portion 409 executes high-pass filter processing, and the like for the shot image and extracts the plane area highlighting its outline, together with the depth information. Then, the environment detecting portion 409 performs evaluation as a reflection surface, for the extracted plane area based on at least any one of a size and surface roughness. At this time, the environment detecting portion 409 performs the evaluation based on the size, an AE evaluation value, a contrast evaluation value, and color of the extracted plane area. Here, if the extracted area is a plane, has a sufficient plane area, and is judged to have a smooth surface from the contrast evaluation value, the color and a brightness value, then the evaluation value is high as a reflection surface. On the other hand, if the area of the extracted plane area is small, there is a strong possibility that a radiated radio signal reflects diffusely or scatters, and therefore, the evaluation value is low as a reflection surface. Further, if the plane area is a moving body, there is a strong possibility that a state changes during wireless communication, and therefore, the evaluation value is low as a reflection surface. The environment detecting portion 409 stores the reflection surface and the evaluation value into the storage portion 103 associating them with each other.

The communication route judging portion 410 extracts roughly estimated communication routes. Specifically, the communication route judging portion 410 extracts roughly estimated communication routes from a radiation surface of the directional transmission antenna to the receiving apparatus 110 by adding position information about the receiving apparatus 110 to the two-dimensional or three-dimensional data as the geometric information generated by the mapping processing portion 408. It should be noted that the position information about the receiving apparatus 110 can be acquired by a process of S604 of a flowchart in FIG. 6 to be described later. The communication route judging portion 410 calculates positions to possibly be reflection surfaces from the extracted roughly estimated communication routes and notifies the environment detecting portion 409 of the positions. Here, the roughly estimated communication routes include communication routes through which the receiving apparatus 110 is reached by a direct wave (a communication route by direct wave) and communication routes using a reflection surface, through which the receiving apparatus 110 is reached by a reflected wave (a communication route by reflected wave). The communication route judging portion 410 can derive the communication routes by direct wave from the position information about the receiving apparatus 110. In order to extract the communication routes by reflected wave, the communication route judging portion 410 estimates reflection surfaces by the two-dimensional or three-dimensional data as the geometric information and extracts roughly estimated communication routes that reach the receiving apparatus 110 via the estimated reflection surfaces. Next, the communication route judging portion 410 stores communication routes with a strong possibility of communication with the receiving apparatus 110, among the extracted roughly estimated communication routes, into the storage portion 103. At this time, the communication routes with a high communicability include, for example, communication routes by direct wave and communication routes by reflected wave using a reflection surface. The roughly estimated communication routes stored in the storage portion 103 are used as criteria at the time of the image pickup apparatus 100 and the receiving apparatus 110 searching for transmission/reception directions with the strongest possibility of directional communication while changing transmission/reception directions.

Further, the communication route judging portion 410 determines a communication parameter for each roughly estimated communication route. At this time, the communication route judging portion 410 can determine the communication parameter based on a reflection surface evaluation value by the environment detecting portion 409, and the like. For example, for a communication route using a reflection surface with a low evaluation value, a communication parameter to give a narrow directivity can be determined; and, for a communication route using a reflection surface with a high evaluation value, a communication parameter to give a wide directivity can be determined. Specifically, in the case of a flat reflection surface with a small area, the communication route judging portion 410 determines the communication parameter to give a narrow directivity. On the other hand, in the case of a reflection surface with a large area and with a lot of unevenness, the communication route judging portion 410 determines the communication parameter to give a wide directivity. Further, in the case of a communication route with a long distance to the receiving apparatus 110, a communication parameter to increase communication strength is determined. On the other hand, in the case of a communication route with a short distance to the receiving apparatus 110, a communication parameter to widen directivity and decrease communication strength is determined. Therefore, for example, for a communication route with a large reflection surface area and a short communication distance, a communication parameter to decrease communication strength and give a narrow directivity is determined. Further, for a communication route derived by two or more reflections, and the like, a communication parameter to increase communication strength and give a narrow directivity is determined because scattering and attenuation occur at each time of reflection. The communication route judging portion 410 associates a determined communication parameter with each roughly estimated communication route and stores the communication parameter and the roughly estimated communication route into the storage portion 103.

Figure 5:
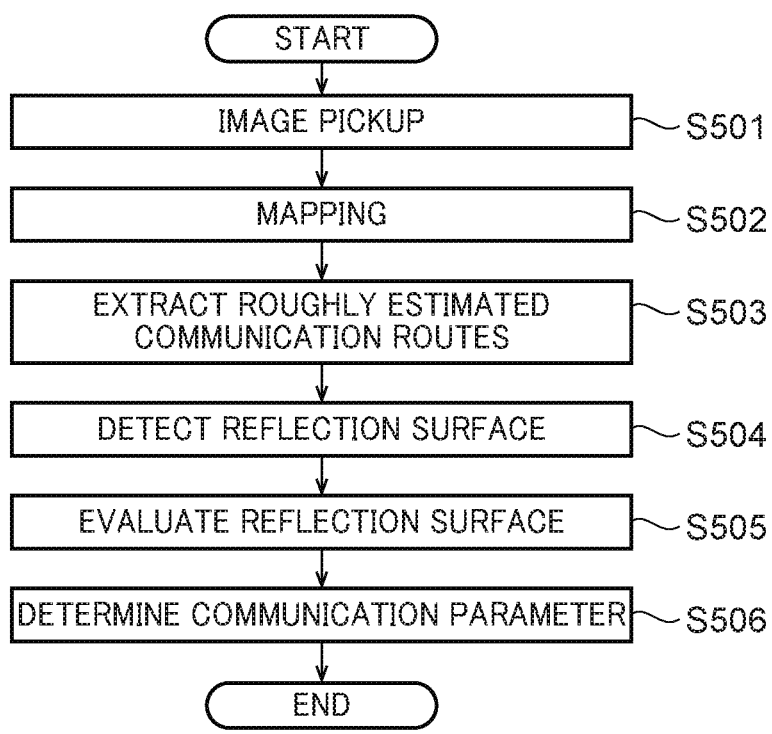
FIG. 5 is a flowchart showing a process performed at the time of extracting a communication route.

FIG. 5 is a flowchart showing an example of the process performed at the time of extracting the roughly estimated communication routes, which is realized by the control portion 102 executing the program stored in the storage portion 103 to control the image pickup portion 104. In S501, the image pickup portion 104 acquires a shot image by shooting a surrounding environment. Further, the depth detecting portion 406 acquires depth information about the surrounding environment. In S502, the mapping processing portion 408 generates two-dimensional or three-dimensional data as geometric information about the surrounding environment. In S503, the communication route judging portion 410 extracts roughly estimated communication routes from the geometric information. For example, the communication route judging portion 410 extracts communication routes by direct wave and communication routes by reflected wave. In S504, the environment detecting portion 409 detects reflection surfaces based on the roughly estimated communication routes extracted by the communication route judging portion 410. In S505, the environment detecting portion 409 performs evaluation of the detected reflection surfaces. In S506, the communication route judging portion 410 acquires information about roughly estimated communication routes with a high communicability with the receiving apparatus 110 from among the roughly estimated communication routes extracted by the communication route judging portion 410. For example, the communication route judging portion 410 acquires information about roughly estimated communication routes using reflection surfaces evaluated by the environment detecting portion 409 to be equal to or greater than a predetermined evaluation value, and excludes or deletes information about roughly estimated communication routes using reflection surfaces evaluated lower than the predetermined evaluation value. Then, the communication route judging portion 410 determines a communication parameter for each of the acquired roughly estimated communication routes.

Figure 6:
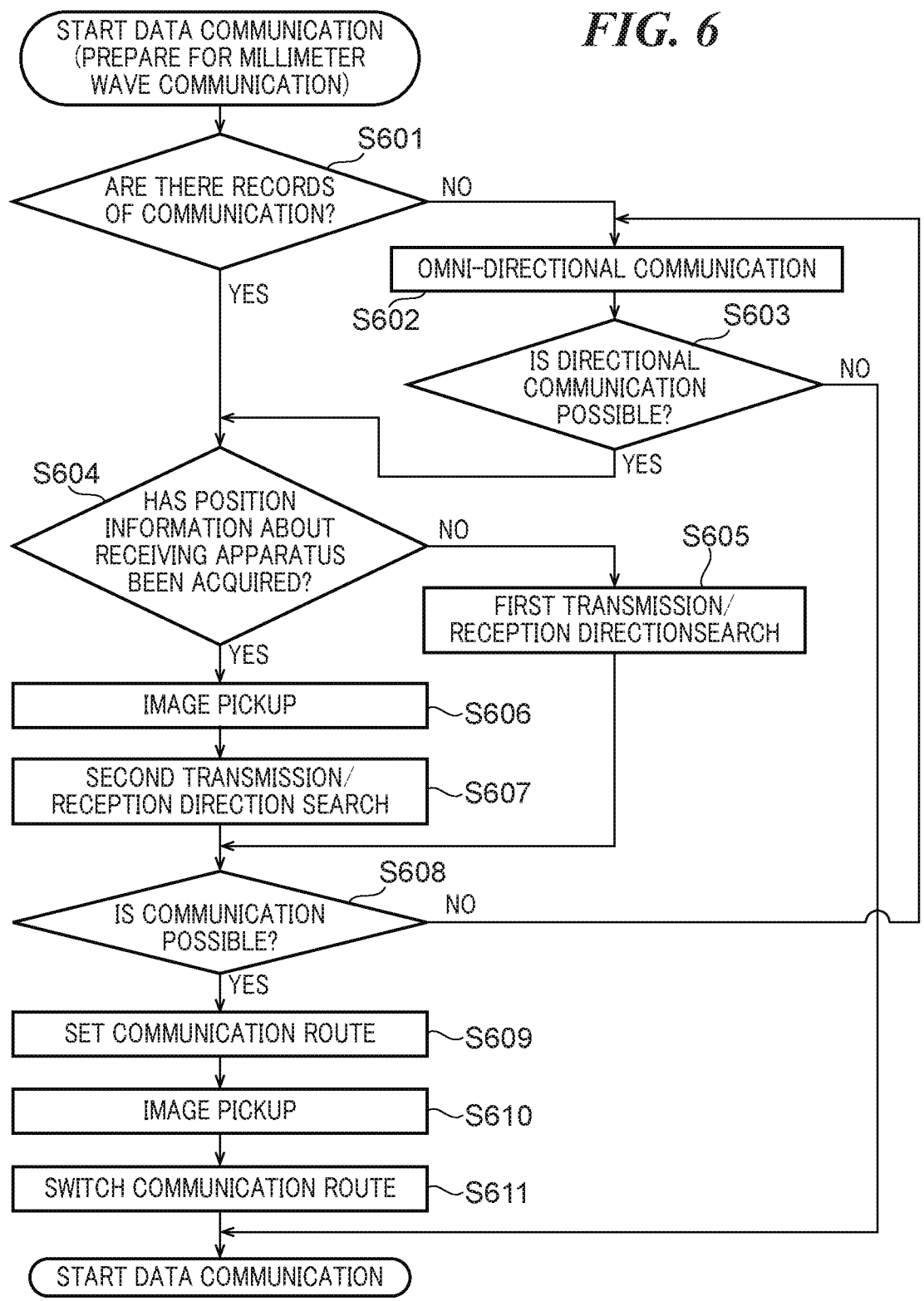
FIG. 6 is a flowchart showing a process performed before directional communication is started.

FIG. 6 is a flowchart showing an example of a process performed before directional communication is started, which is realized by the control portion 102 executing the program stored in the storage portion 103. Further, the flowchart of FIG. 6 is started by start of wireless communication between the image pickup apparatus 100 and the receiving apparatus 110 being selected by a user. In S601, the control portion 102 of the image pickup apparatus 100 judges whether there are records of directional communication with the receiving apparatus 110 or not. If there is no communication record, the flow proceeds to S602, and the control portion 102 performs wireless connection with the receiving apparatus 110 in a predetermined authentication method by omni-directional communication, for example, by Wi-Fi or the like.

In S603, when the wireless connection with the receiving apparatus 110 is completed, the control portion 102 judges whether it is possible or not to perform directional communication with the receiving apparatus 110 using a carrier frequency of, for example, 60 GHz. If directional communication is not possible, the control portion 102 starts data communication by omni-directional communication. On the other hand, if directional communication is possible, the flow proceeds to S604. In S604, the control portion 102 judges whether position information about the receiving apparatus 110 has been acquired or not. The position information may be any of relative position information about the receiving apparatus 110 relative to the image pickup apparatus 100 and absolute position information about the receiving apparatus 110. Here, the position information includes three-dimensional position information in which a position of the receiving apparatus 110 is mapped, information simply about transmission/reception directions in directional communication, and the like.

For example, by each of the image pickup apparatus 100 and the receiving apparatus 110 being provided with a position detecting unit, such as a GPS device, which receives position information from the receiving apparatus 110 via omni-directional communication and comparing the position information with position information about the image pickup apparatus 100, the position information about the receiving apparatus 110 can be acquired. If the receiving apparatus 110 has a characteristic shape, the control portion 102 may acquire the position information about the receiving apparatus 110 by distinguishing the receiving apparatus 110 by object recognition, or the like from a shot image shot by the image pickup portion 104. At this time, the control portion 102 receives, for example, information about a shape, size, color, and the like as feature values of the receiving apparatus 110 via omni-directional communication. The control portion 102 may acquire the position information about the receiving apparatus 110 by distinguishing an object corresponding to the feature values of the receiving apparatus 110 from pattern recognition of a shot image of a surrounding environment shot by the image pickup portion 104. It should be noted that, if the position information has not been acquired in S604, the flow proceeds to S605. If the position information has been acquired, the flow proceeds to S606.

In S605, the control portion 102 performs a first transmission/reception direction search. The first transmission/reception direction search is a method in which all combinations of transmission/reception directions enabling directional communication are searched for by each of the image pickup apparatus 100 and the receiving apparatus 110. Specifically, the control portion 102 searches for the combinations of transmission/reception directions enabling directional communication by a transmission/reception direction search shown in FIG. 3. As a result of the search, the control portion 102 stores and sets a communication route with a combination of transmission/reception directions with a high receiving sensitivity or SN value in the storage portion 103 as a switching candidate communication route. In S606, the control portion 102 shoots a surrounding environment and the receiving apparatus 110 by the image pickup portion 104. At this time, as for an image pickup direction of the image pickup portion 104, the control portion 102 controls the image pickup portion 104 so that the transmission/reception direction is included within an image pickup angle of view, based on the acquired position information about the receiving apparatus 110. Next, the image pickup portion 104 identifies a position of the receiving apparatus 110 in a shot image based on the shot image and the position information about the receiving apparatus 110. Then, the image pickup portion 104 acquires information about roughly estimated communication routes by executing a process from S502 to S506 in the flowchart of FIG. 5. For example, information about communication routes by direct wave and communication routes by reflected wave is acquired as the roughly estimated communication routes.

In S607, the control portion 102 performs a second transmission/reception direction search. The second transmission/reception direction search is a method in which, for each roughly estimated communication route, combinations of transmission/reception directions enabling directional communication are searched for around the communication route by each of the image pickup apparatus 100 and the receiving apparatus 110. At this time, the control portion 102 searches for the combinations of transmission/reception directions using a communication parameter stored in association with each communication route. It should be noted that, by performing the search around the roughly estimated communication route, the number of combinations of transmission/reception directions can be reduced in comparison with performing the search for all the combinations of transmission/reception directions, and search time can be significantly shortened. In the case of performing the transmission/reception direction search for the communication routes by reflected wave, the control portion 102 performs the search in descending order of evaluation of the communication routes by the environment detecting portion 409. The control portion 102 performs the transmission/reception direction search in descending order of evaluation of the communication routes, and, if there is no combination of transmission/reception directions enabling directional communication, the transmission/reception direction search for subsequent communication routes may be omitted.

In S608, the control portion 102 judges whether directional communication with the receiving apparatus 110 is possible or not. For example, if it is judged that there is a combination of transmission/reception directions with a predetermined or higher receiving sensitivity or a predetermined or higher SN value, from a result of the transmission/reception direction search, the control portion 102 judges that directional communication is possible and proceeds to S609. On the other hand, if there is no combination of transmission/reception directions with the predetermined or higher receiving sensitivity or the predetermined or higher SN value, the control portion 102 judges that directional communication is not possible and proceeds to S602. Here, the case where directional communication is not possible is, for example, a case where a radio signal is absorbed because a reflection surface is a particular absorber. Thus, since there is a possibility that communication is actually not possible depending on roughly estimated communication routes, it is judged whether the roughly estimated communication routes actually enable communication or not.

In S609, for each roughly estimated communication route, the control portion 102 updates the communication route so that a transmission/reception directions in which directional communication with the receiving apparatus 110 is the most possible is obtained and sets the communication route. For example, for each roughly estimated communication route, the control portion 102 updates the communication route so that a transmission/reception direction with the highest receiving sensitivity or a transmission/reception direction with the highest SN value are obtained based on a result of the transmission/reception direction search and stores the communication route into the storage portion 103. The communication route stored here becomes a switching candidate communication route at the time of switching a communication route. It should be noted that, if there are a plurality of switching candidate communication routes, the control portion 102 sets priority order used at the time of switching a communication route. For example, the control portion 102 sets the priority order used at the time of switching a communication route in descending order of receiving sensitivities or in descending order of SN values, based on the result of the transmission/reception direction search. Further, the control portion 102 excludes communication routes corresponding to combinations of transmission/reception directions with a receiving sensitivity below a predetermined receiving sensitivity or an SN value below a predetermined SN value from the switching candidate communication routes based on the result of the transmission/reception direction search.

In S610, the control portion 102 shoots a surrounding environment by the image pickup portion 104. In S611, the control portion 102 switches to the most appropriate communication route from among the switching candidate communication routes based on the surrounding environment shot by the image pickup portion 104 and the priority order. Specifically, the control portion 102 switches the communication route to a communication route with the highest priority if the communication route with the highest priority is not blocked by an obstacle, and switches the communication route to a communication route with the next highest priority if the communication route with the highest priority is blocked by an obstacle. By controlling the wireless communication portion 101, the control portion 102 changes a transmission direction of the directional transmission antenna to a transmission direction corresponding to the switched communication route. Further, the control portion 102 notifies the receiving apparatus 110 of information about the switched communication route. Therefore, the receiving apparatus 110 changes a reception direction of the directional receiving antenna to a reception direction corresponding to the switched communication route. Next, by controlling the wireless communication portion 101, the control portion 102 starts data transmission to the receiving apparatus 110 by directional communication.

Figure 7A:
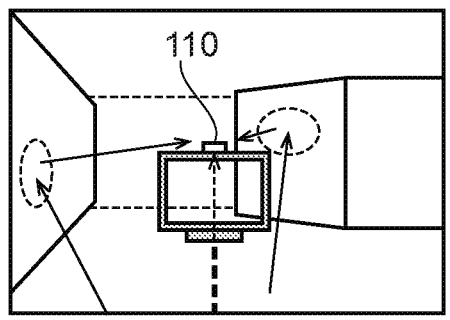
FIGS. 7A to 7E are schematic view which are useful in explaining the process for extracting a communication route.
Figure 7B:
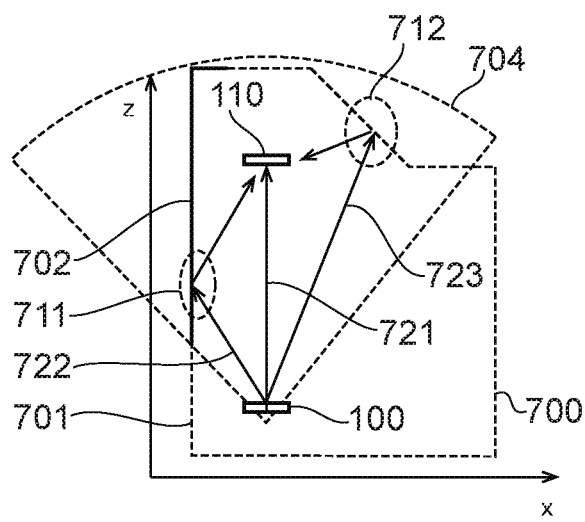
Figure 7C:
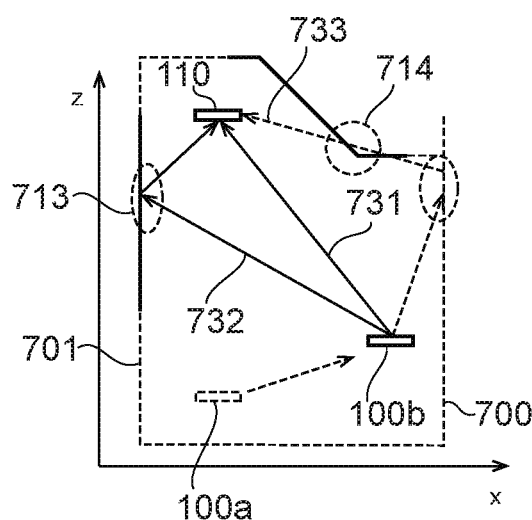

FIGS. 7A to 7C are schematic diagrams for illustrating examples of extracted communication routes.

Though description will be made on a case where geometric information about a surrounding environment is two-dimensional data here, three-dimensional data is also applicable. FIG. 7A is a view showing an image pickup area when the image pickup portion 104 has shot an inside of a room. Arrows shown in FIG. 7A schematically indicate communication routes of directional communication. FIGS. 7B and 7C are schematic views when a room 700 shot by the image pickup portion 104 is seen from a top surface. The room 700 is surrounded by a wall 701. Broken lines of the wall 701 indicate positions of the wall 701, and solid lines are those mapped by the mapping processing portion 408. An area 704 is an image pickup range which can be shot by the image pickup portion 104 of the image pickup apparatus 100. It should be noted that, as for the image pickup range, the image pickup portion 104 may be capable of shooting in all directions or may be capable of changing the image pickup range by being provided with an optical portion having a predetermined angle-of-view range and a movable portion capable of changing an image pickup direction. By updating data generated by the mapping processing portion 408 while changing the image pickup range, a wider surrounding environment can be modeled.

Figure 7D:
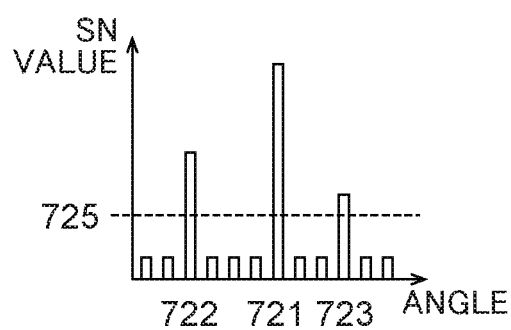
Figure 7E:
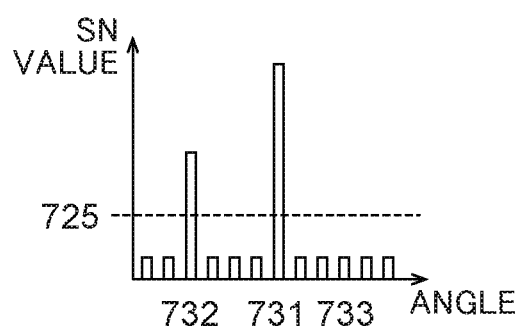

FIGS. 7D and 7E are graphs obtained by plotting SN values, communication strengths at the time of performing a transmission/reception direction search. A horizontal axis indicates angles, and a vertical axis indicates the SN values. A threshold 725 shows an SN value at which directional communication is possible. FIG. 7B shows reflection surfaces 711 and 712 detected on the wall 701 by the environment detecting portion 409. Here, a communication route 721 by direct wave and communication routes 722 and 723 by reflected wave are extracted as roughly estimated communication routes of directional communication between the image pickup apparatus 100 and the receiving apparatus 110. In FIG. 7D, an SN value of the communication route 721 is the highest among the communication routes 721, 722 and 723. Therefore, if the communication routes 721, 722 and 723 become switching candidates at the time of switching a communication route, the communication route 721 is given the highest priority. Therefore, the control portion 102 switches the communication route to the communication route 721 as the most appropriate communication route according to the surrounding environment shot by the image pickup portion 104 to perform directional communication.

FIG. 7C shows a change in the communication routes in a case where the image pickup apparatus 100 has moved from an initial position 100a to a position 100b. The control portion 102 detects movement of its own apparatus from a change in the surrounding environment shot by the image pickup portion 104. In response to the detection of the movement of its own apparatus, the control portion 102 re-sets switching candidate communication routes. Further, the control portion 102 detects movement of the receiving apparatus 110 from the change in the surrounding environment shot by the image pickup portion 104. In response to the detection of the movement of the receiving apparatus 110, the control portion 102 resets switching candidate communication routes. At this time, an area 713 on the wall 701 is detected as a reflection surface by the environment detecting portion 409. Here, a communication route 731 by direct wave and a communication route 732 by reflected wave are extracted as communication routes of directional communication between the image pickup apparatus 100 and the receiving apparatus 110. It should be noted that a communication route 733 by reflected wave is not extracted because of being interrupted by a wall 714.

Though description has been made on the case of detecting side walls as reflection surfaces and extracting communication routes using the reflection surfaces here, extraction of communication routes is not limited to this case. Communication routes using a ground (a bottom surface) or a ceiling (the top surface) as a reflection surface may be extracted. In an indoor environment, there are generally few obstacles on a ceiling, communication routes using reflection surfaces can be extracted. When roughly estimated communication routes are extracted, the second transmission/reception direction search described above is performed; communication routes through which directional communication is possible are set as switching candidate communication routes; switching is performed to a communication route that is the most appropriate for communication among the switching candidate communication routes; and data communication is started. In FIG. 7C, an SN value of the communication route 731 is the highest between the communication routes 731 and 732. Therefore, if the communication routes 731 and 732 become switching candidates at the time of switching a communication route, the communication route 731 is given the highest priority. Therefore, the control portion 102 switches the communication route to the communication route 731 as the most appropriate communication route according to the surrounding environment shot by the image pickup portion 104 to perform directional communication.

Figure 8A:
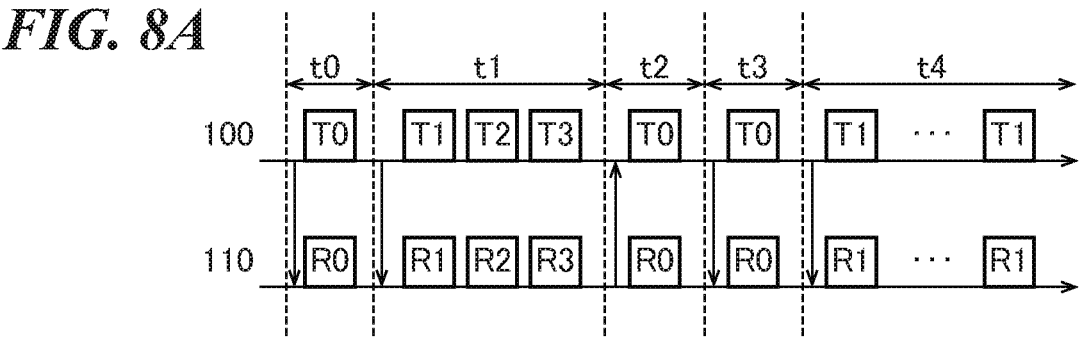
FIGS. 8A to 8C are diagrams for illustrating the method for searching for transmission/reception directions.

FIG. 8A is a timing chart which is useful in explaining an example of a method for performing the second transmission/reception direction search based on roughly estimated communication routes, and setting priority order of communication routes to be switching candidates. Transmission directions of transmit packets between the image pickup apparatus 100 and the receiving apparatus 110 are indicated by arrows. In a period t0, data communication by directional communication is performed by a transmission/reception direction combination of a transmission direction T0 of the image pickup apparatus 100 and a reception direction R0 of the receiving apparatus 110. Specifically, in the period t0, by the image pickup apparatus 100 starting a transmission/reception direction search, transmission/reception direction search conditions are transmitted in a currently selected transmission direction. Next, in a period t1, the image pickup apparatus 100 and the receiving apparatus 110 perform transmission and receiving of test packets while changing the transmission/reception directions according to the transmission/reception direction search conditions transmitted in the period t0. Here, each of a transmission/reception directions combination of a transmission direction T1 and a reception direction R1, a transmission/reception directions combination of a transmission direction T2 and a reception direction R2, and a transmission/reception directions combination of a transmission direction T3 and a reception direction R3 correspond to respective roughly estimated communication routes. It should be noted that arrival time of a communication signal changes according to communication routes of directional communication. Therefore, transmission and receiving time for the test packet is set to sufficient transmission and receiving time in consideration of the arrival time. For example, a timing of switching the transmission/reception directions of the image pickup apparatus 100 and the receiving apparatus 110 may be managed based on time elapsed after start of a transmission/reception direction search. Further, order of combinations of transmission/reception directions may be presented as a transmission/reception direction search condition so that the reception direction of the receiving apparatus 110 may be sequentially switched according to the determined order of the combinations at the same time when receiving of each test packet ends.

Figure 8B:
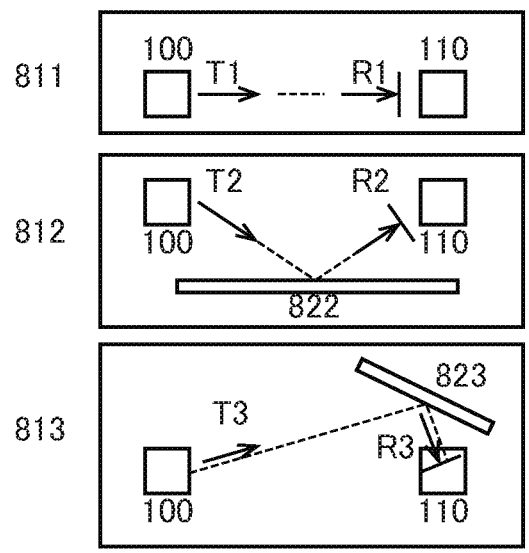

FIG. 8B shows combinations of transmission/reception directions enabling directional communication between the image pickup apparatus 100 and the receiving apparatus 110. A transmission/receiving pattern 811 is the transmission and reception directions combination of the transmission direction T1 and the reception direction R1. A transmission/receiving pattern 812 is a combination of transmission/reception directions in which a transmit signal from the transmission direction T2 is received in the reception direction R2 via a reflection surface 822. A transmission/receiving pattern 813 is a combination of transmission/reception directions in which a transmit signal from the transmission direction T3 is received in the reception direction R3 via a reflection surface 823.

In a period t2, the image pickup apparatus 100 and the receiving apparatus 110 change the transmission/reception directions to the reception direction T0 and the transmission direction R0, respectively. Feedback (FB) values, which are a result of the transmission/reception direction search in the period t1, are transmitted from the receiving apparatus 110 to the image pickup apparatus 100. An FB value is an evaluation value capable of evaluating communication quality such as received signal strength (RSSI), apt SN value and a communication error rate. The control portion 102 judges whether or not directional communication is possible with the combinations of transmission/reception directions, based on the received FB values, respectively, and stores results into the storage portion 103. Here, first, the control portion 102 sets the transmission/receiving pattern 811, which is the combination of the transmission direction T1 with the highest FB value and the reception direction R1, as a communication route with the highest priority. In a period t3, the image pickup apparatus 100 notifies the receiving apparatus 110 of the transmission/reception direction change condition while the transmission direction T0 and the reception direction R0 are still set for the image pickup apparatus 100 and the receiving apparatus 110, respectively. In a period t4, the transmission direction of the image pickup apparatus 100 is changed to the transmission direction T1 determined by the control portion 102 in the period t2. The receiving apparatus 110 changes the reception direction to the reception direction R1 according to the change condition notified from the image pickup apparatus 100 and restarts data communication by directional communication.

Figure 8C:
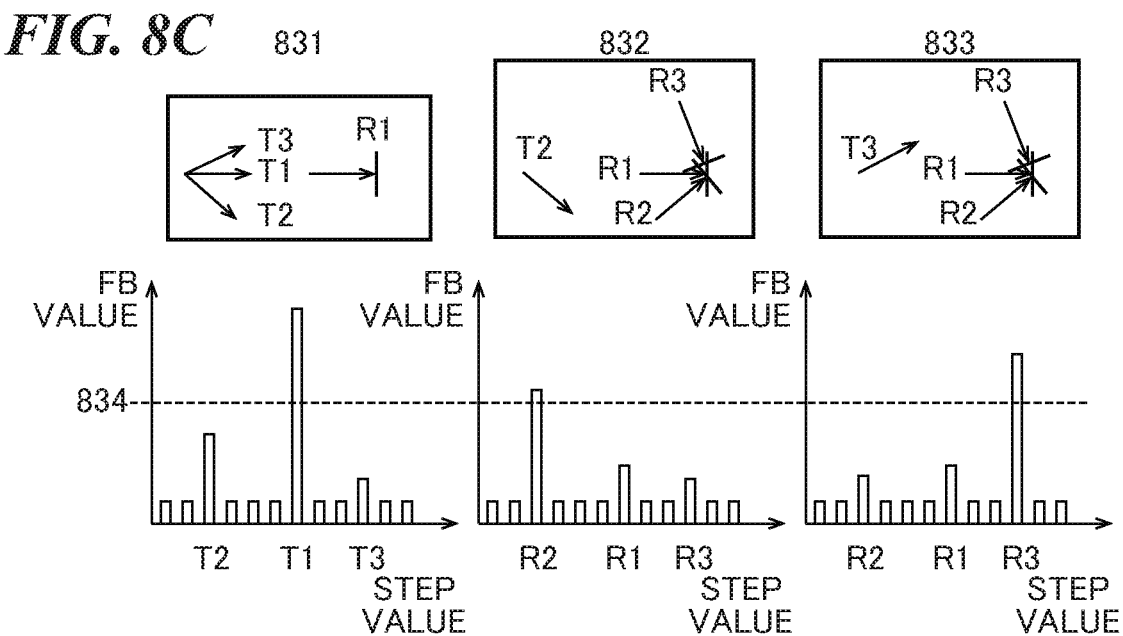

FIG. 8C is a graph showing FB values at the time of performing transmission/reception direction search for all combinations of transmission and reception directions. A horizontal axis indicates step values at the time of changing a transmission direction or a reception direction, and a vertical axis indicates the FB values. Further, a threshold 834 indicates an FB value at which directional communication is possible. A transmission/reception direction search 831 shows FB values when the transmission direction is changed relative to the reception direction R1. A transmission/reception direction search 832 shows FB values when the reception direction is changed relative to the transmission direction T2. A transmission/reception direction search 833 shows FB values when the reception direction is changed relative to the transmission direction T3. As shown in the transmission/reception direction search 831, a result is obtained that, among the transmission/reception directions, the FB value is the highest in the transmission direction T1, the next highest in the transmission direction T2 and then in the transmission direction T3. Through the transmission/reception direction searches 831, 832 and 833, it is only the combinations shown in FIG. 83 that are combinations of transmission/reception directions exceeding the threshold 834.

In the case of performing a transmission/reception direction search using only FB values, it is not possible to find a combination of transmission/reception directions appropriate for directional communication unless the search is performed for all combinations of transmission/reception directions. However, as the number of combinations of transmission/reception directions required for the transmission/reception direction search increases, time required for the transmission/reception direction search increases, and a band for data communication required for directional communication is pressed. On the other hand, by extracting roughly estimated communication routes based on a shot image of a surrounding environment shot by the image pickup portion 104 and performing a transmission/reception direction search for each of the roughly estimated communication routes as shown in FIG. 8A, it is possible to narrow down combination candidates without performing the transmission/reception direction search for all directions. Therefore, search time at the time of performing the transmission/reception direction search can be significantly shortened. Further, since the process for extracting the roughly estimated communication routes based on a shot image shot by the image pickup portion 104 and a process for searching for transmission/reception directions in which directional communication is possible can be performed in parallel, it is possible to prevent a communication band for directional communication from being pressed.

It should be noted that priority order used at the time of switching a communication route is not limited to the case of setting the priority order according to communication quality evaluation values such as receiving sensitivities, SN values and FB values. The priority order may be set based on a shot image shot by the image pickup portion 104. For example, the control portion 102 may give a higher priority to a communication route on a far side of an obstacle detected by the moving body judging portion 407 than a communication route on a near side, give a higher priority to a communication route on an opposite side of a movement direction of an obstacle or set a priority in consideration of an arrangement advantage. In FIG. 8A, description has been made on the case of performing a transmission/reception direction search only for combinations of transmission and reception directions corresponding to roughly estimated communication routes. On the other hand, as described in FIG. 6, it is preferable that the control portion 102 performs, for each of the roughly estimated communication routes, transmission/reception direction search around the communication route, that is, around a combination of transmission and reception directions corresponding to the roughly estimated communication route. By performing, for each of the roughly estimated communication routes, a transmission/reception direction search around the communication route, it is possible to update the communication route so that a transmission/reception direction in which directional communication is the most possible is obtained.

According to the present embodiment, the control portion 102 extracts roughly estimated communication routes for performing wireless communication with the receiving apparatus 110 based on a shot image shot by the image pickup portion 104 and sets switching candidate communication routes based on the roughly estimated communication routes. Therefore, since it is possible to set the switching candidate communication routes with the roughly estimated communication routes as criteria, it is possible to shorten time for setting the communication routes. Further, according to the present embodiment, by performing a search for transmission/reception directions in which wireless communication is possible, based on the roughly estimated communication routes, it is possible to significantly shorten search time, for example, in comparison with the case of searching all transmission/reception directions. Further, the process for extracting the roughly estimated communication routes based on a shot image shot by the image pickup portion 104 and the process for searching for transmission/ reception directions in which directional communication is possible can be performed in parallel. Further, according to the present embodiment, since the roughly estimated communication routes are extracted based on the shot image shot by the image pickup portion 104 and depth information detected by the depth detecting portion 406, it is possible to extract communication routes with high accuracy.

It should be noted that, though description has been made on the process for setting switching candidate communication routes before starting directional communication in the present embodiment, the switching candidate communication routes may be set according to a change in a surrounding environment shot by the image pickup portion 104 after starting directional communication. In this case, even if a communication route is blocked by an obstacle after a surrounding environment changes, it is possible to switch to a communication route in consideration of the change in the surrounding environment. Therefore, wireless communication with the receiving apparatus 110 can be maintained.

Though description has been made on the case of extracting roughly estimated communication routes based on a shot image shot by the image pickup portion 104 and setting switching candidate communication routes by performing a transmission/reception direction search for each of the extracted roughly estimated communication routes in the present embodiment, setting of the switching candidate communication routes is not limited to this case. For example, roughly estimated communication routes may be extracted based on a shot image shot by the image pickup portion 104, and the extracted roughly estimated communication routes may be set as switching candidate communication routes.

Second Embodiment

In a second embodiment, description will be made on a process for the image pickup apparatus 100 switching a communication route when there is an obstacle on the communication route.

Figure 9A:
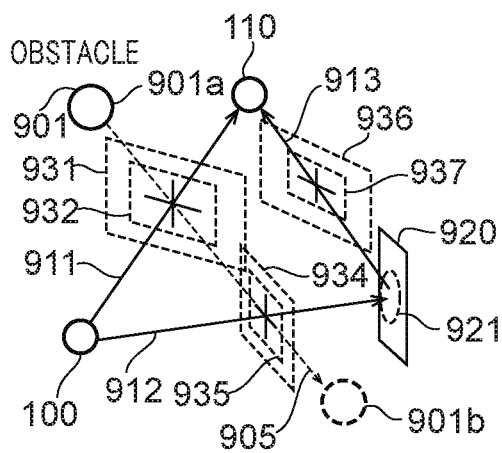
FIGS. 9A to 9D are views which are useful in explaining a process performed at the time of switching a communication route.

FIGS. 9A to 9D are views which are useful in explaining a process performed at the time of switching a communication route. FIG. 9A shows a positional relationship among the image pickup apparatus 100 and the receiving apparatus 110 arranged in free space, and an obstacle 901. A communication route 911 is a communication route by direct wave. A communication route 912-913 is a communication route by reflected wave that enables directional communication between the image pickup apparatus 100 and the receiving apparatus 110 by being reflected by a reflection surface 921 of a wall 920. The obstacle 901 moves from a position 901a to a position 901b. A broken line 905 indicates a movement route of the obstacle 901, which crosses the communication routes 911 and 912. In a surrounding environment shot by the image pickup apparatus 100, image pickup areas including the communication routes 911, 912 and 913 are image pickup areas 931, 934 and 936, respectively.

Figure 9B:
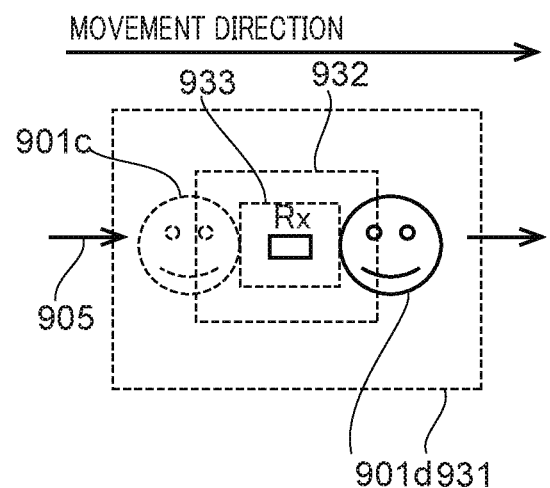

FIG. 9B shows a shot image of the image pickup area 931, the movement route of the obstacle 901 moving on the shot image, and first to fourth threshold areas for making an obstacle avoidance judgment. A first threshold area 932 and the fourth threshold area 932 are the same area, and a second threshold area 933 and the third threshold area 933 are the same area. By the obstacle 901 entering the first threshold area 932, communication route switching preparation is performed. By the obstacle 901 entering the second threshold area 933, communication route switching is performed. By the obstacle 901 exiting the third threshold area 933, communication route switching preparation is performed. By the obstacle 901 exiting the fourth threshold area 932, communication route switching is performed. The control portion 102 sets the first to fourth threshold areas on positions on the shot image, which overlap with communication routes. For example, the control portion 102 sets the first to fourth threshold areas such that centers of the first to fourth threshold areas substantially overlap with the communication routes. Further, the control portion 102 changes sizes of the first to fourth threshold areas based on at least one of a size of the receiving apparatus 110, a size of the obstacle 901, a movement speed of the obstacle 901, a distance to the obstacle 901, an image pickup angle of view of the image pickup portion 104 and the like. For example, if the movement speed of the obstacle 901 is fast, the threshold areas are expanded. If time for a transmission/ reception direction search for directional communication is long, the first threshold area 932 and the fourth threshold area 932 are expanded.

Figure 10:
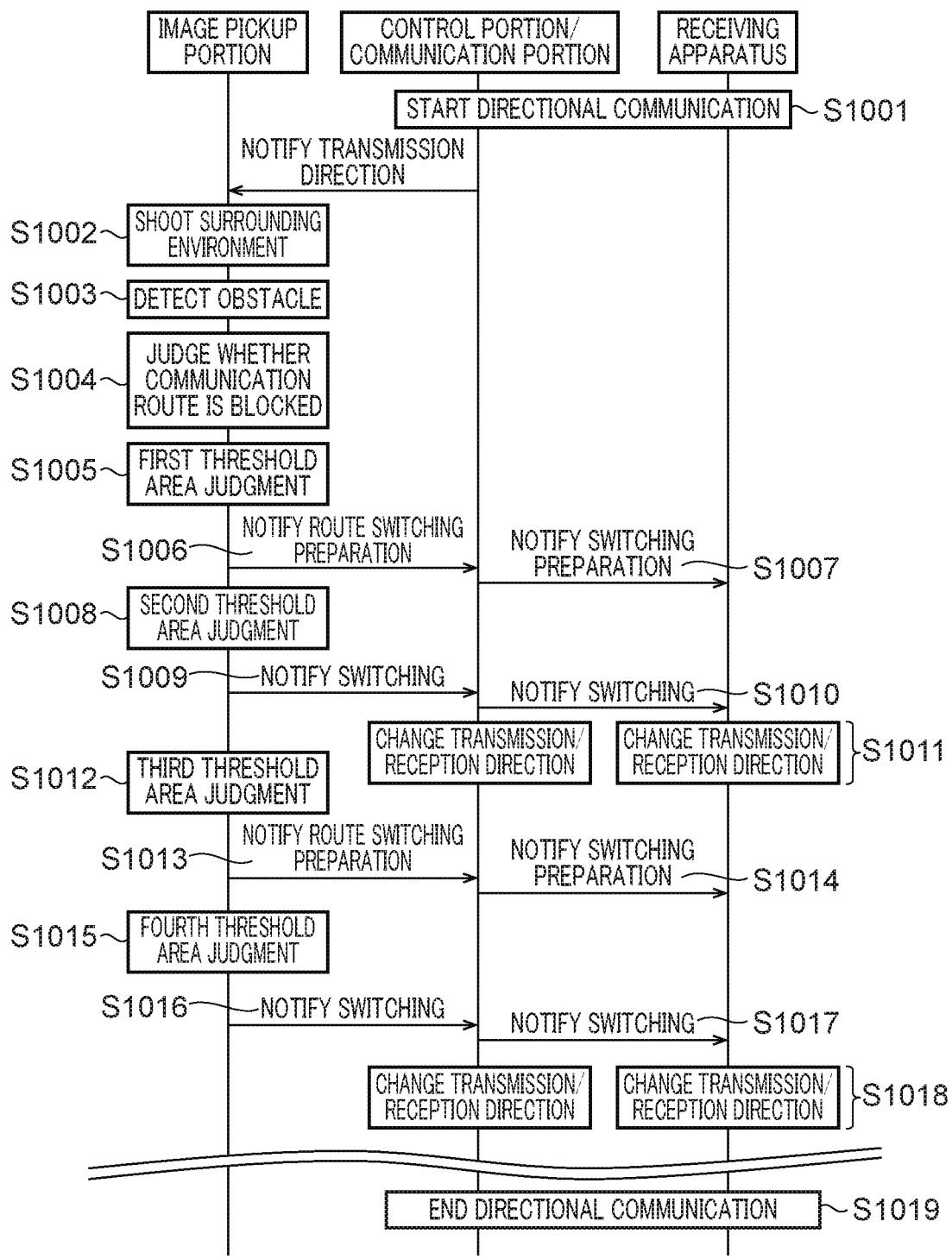
FIG. 10 is a flowchart showing the process for switching a communication route.

FIG. 10 is a flowchart showing an example of a process for switching a communication route in the positional relationship in FIG. 9A when the obstacle 901 blocks the communication route, which is realized by the control portions 102 and 112 executing the programs stored in the storage portions 103 and 113. The flowchart of FIG. 10 is started by directional communication being performed between the image pickup apparatus 100 and the receiving apparatus 110. In S1001, the control portion 102 of the image pickup apparatus 100 controls the wireless communication portion 101 to select a communication route that is the most appropriate for communication with the receiving apparatus 110 and starts directional communication. Specifically, the control portion 102 selects a communication route set to the highest priority and starts directional communication. In S1002, the control portion 102 notifies the image pickup portion 104 of a transmission/reception direction and a directivity width for directional communication through the selected communication route. The image pickup portion 104 changes an image pickup range so that the notified transmission/reception direction and directivity width are within an image pickup angle of view and shoots a surrounding environment.

In S1003, the obstacle 901 enters the image pickup area 931, and, whereby, the moving body judging portion 407 detects the obstacle 901 in the image pickup area 931. By the environment detecting portion 409 extracting a shape of the obstacle 901 and the depth detecting portion 406 detecting depth information about the obstacle 901, three-dimensional data of the obstacle 901 is generated. The moving body judging portion 407 detects a position of the obstacle 901 by comparing the three-dimensional data of the obstacle 901 with two-dimensional or three-dimensional data of the surrounding environment generated by the mapping processing portion 408. Further, the moving body judging portion 407 detects a movement direction of the obstacle 901. In S1004, the moving body judging portion 407 judges whether or not there is a possibility that the obstacle 901 blocks the communication route, based on the position and movement direction of the obstacle 901. For example, if the possibility of blocking the communication route does not exist because the position of the obstacle 901 is farther than the receiving apparatus 110, the control portion 102 ignores the obstacle 901 and prevents the communication route from being switched. On the other hand, if the position of the obstacle 901 is nearer than the receiving apparatus 110, and it is judged that the possibility of blocking the communication route exists, based on the movement direction, the flow proceeds to S1005.

In S1005, the moving body judging portion 407 makes a threshold area judgment about the obstacle 901 on the image pickup area 931. Specifically, the moving body judging portion 407 judges whether the obstacle 901 has advanced into the first threshold area 932 or not, that is, whether the obstacle 901 has entered the first threshold area 932 or not. If the obstacle 901 has entered the first threshold area 932, the flow proceeds to S1006. In S1006, the moving body judging portion 407 notifies the control portion 102 of communication route switching preparation. In S1007, when receiving the notification from the moving body judging portion 407 of the image pickup portion 104, the control portion 102 notifies the receiving apparatus 110 of directional communication switching preparation via the wireless communication portion 101. Here, the switching preparation notification includes information about a communication route to be switched to, information about at which frame the switching is to be performed with a switching notification to be described later as a trigger, information about a position and shift in a case where the image pickup apparatus 100 is moving, and the like. The information about a communication route to be switched to is information about a communication route set to the next highest priority, and, here, the information is information about the communication route 912-913.

In S1008, the moving body judging portion 407 judges whether the obstacle 901 has advanced into the second threshold area 933 or not, that is, whether the obstacle 901 has entered the second threshold area 933 or not. If the obstacle 901 has entered the second threshold area 933, the flow proceeds to S1009. In S1009, the moving body judging portion 407 notifies the control portion 102 of communication route switching. In S1010, when receiving the notification from the moving body judging portion 407 of the image pickup portion 104, the control portion 102 notifies the receiving apparatus 110 of directional communication switching via the wireless communication portion 101. In S1011, the control portion 102 changes the transmission direction of the directional transmission antenna of the wireless communication portion 101 to a transmission direction corresponding to the communication route 912, with the switching notification to the receiving apparatus 110 as a trigger. The control portion 112 of the receiving apparatus 110 changes the reception direction of the directional receiving antenna of the wireless communication portion 111 to a reception direction corresponding to the communication route 913.

In S1012, the moving body judging portion 407 judges whether the obstacle 901 has advanced beyond the third threshold area 933 or not, that is, whether the obstacle 901 has completely exited the third threshold area 933 or not. If the obstacle 901 has exited the third threshold area 933, the flow proceeds to S1013. In S1013, the moving body judging portion 407 notifies the control portion 102 of communication route switching preparation. In S1014, when receiving the notification from the moving body judging portion 407 of the image pickup portion 104, the control portion 102 notifies the receiving apparatus 110 of directional communication switching preparation via the wireless communication portion 101. Here, the control portion 102 notifies the receiving apparatus 110 of information about the communication route 911 selected before avoiding the obstacle 901.

In S1015, the moving body judging portion 407 judges whether the obstacle 901 has advanced beyond the fourth threshold area 932 or not, that is, whether the obstacle 901 has completely exited the fourth threshold area 932 or not. If the obstacle 901 has exited the fourth threshold area 932, the flow proceeds to S1016. In S1016, the moving body judging portion 407 notifies the control portion 102 of communication route switching. In S1017, when receiving the notification from the moving body judging portion 407 of the image pickup portion 104, the control portion 102 notifies the receiving apparatus 110 of directional communication switching via the wireless communication portion 101. In S1018, the control portion 102 changes the transmission direction of the directional transmission antenna of the wireless communication portion 101 to a transmission direction corresponding to the communication route 911, with the switching notification to the receiving apparatus 110 as a trigger. Similarly, the control portion 112 of the receiving apparatus 110 changes the reception direction of the directional receiving antenna of the wireless communication portion 111 to a reception direction corresponding to the communication route 911.

In S1019, the image pickup apparatus 100 and the receiving apparatus 110 repeat the process of S1002 to S1018 until the directional communication ends. It should be noted that, though description has been made on the case where, in response to the obstacle 901 exiting the fourth threshold area 932, switching is performed to return the communication route to the communication route 911 here, the directional communication may be continued through the communication route 912-913 even after the obstacle 901 exits the fourth threshold area 932.

Further, even if the obstacle 901 enters the image pickup area 934 or 936 when directional communication is being performed with the communication route 912-913 being selected, communication route switching can be similarly performed by the process from S1002 to S1018. Though description has been made on the case where switching is performed between two communication routes, that is, the communication route 911 by direct wave and the communication route 912-913 by reflected wave here, there may be three or more selective communication routes. Further, the present embodiment is not limited to the case where there is one obstacle but may be applied even when there are a plurality of obstacles. Further, the communication route to be switched to is not limited to a communication route using the reflection surface 921. A communication route via the relay apparatus 120 in which directional communication is possible may be switched to.

Thus, according to the present embodiment, the control portion 102 switches from a first communication route to a second communication route by an obstacle being detected to have exceeded a threshold area on a shot image. Therefore, it is possible to maintain directional communication with the receiving apparatus 110 through the second communication route without the first communication route being blocked by the obstacle. Further, preparation for switching from the first communication route to the second communication route is performed in response to the obstacle being detected to have exceeded a first threshold area on the shot image, and the first communication route is switched to the second communication route by the obstacle being detected to have exceeded a second threshold area. By performing preparation for switching from the first communication route to the second communication route as described above, it is possible to quickly switch from the first communication route to the second communication route when the obstacle has exceeded the second threshold area.

Third Embodiment

In a third embodiment, description will be made on a process performed in the case of performing directional communication via the relay apparatus 120.

Figure 11:
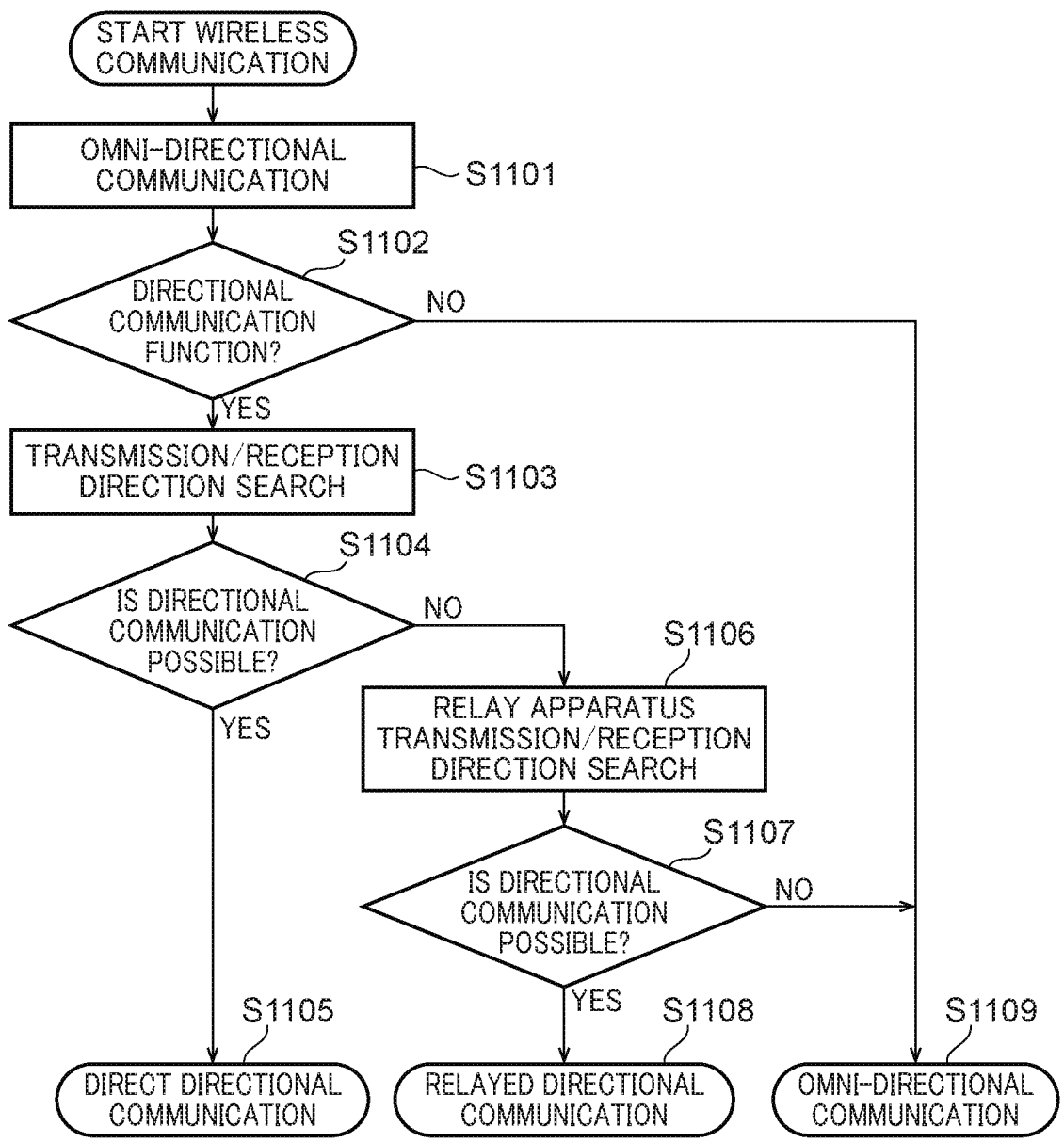
FIG. 11 is a flowchart showing a process performed before directional communication via a relay apparatus is performed.

FIG. 11 is a flowchart showing an example of a process performed before directional communication is performed via the relay apparatus 120, which is realized by the control portion 102 executing the program stored in the storage portion 103. The flowchart of FIG. 11 is started by start of wireless communication between the image pickup apparatus 100 and the receiving apparatus 110 being selected by the user. In S1101, the control portion 102 performs wireless connection with the receiving apparatus 110 in a predetermined authentication method, by omni-directional communication, for example, by Wi-Fi or the like. In S1102, when the wireless connection with the receiving apparatus 110 is completed, the control portion 102 judges whether the receiving apparatus 110 has a directional communication function or not. If the receiving apparatus 110 has the directional communication function, the flow proceeds to S1103.

In S1103, the control portion 102 performs a transmission/reception direction search. The transmission/reception direction search here can be performed by any of the first transmission/reception direction search in S605 stated above or the second transmission/reception direction search in S607. In S1104, the control portion 102 judges whether directional communication with the receiving apparatus 110 is possible or not. This process is similar to the process of S608 stated above. If it is judged that directional communication is possible, the flow proceeds to S1105, and directional communication is performed between the image pickup apparatus 100 and the receiving apparatus 110. On the other hand, if it is judged that directional communication is not possible, the flow proceeds to S1106. In S1106, the control portion 102 gives an instruction to perform a transmission/reception direction search between the image pickup apparatus 100 and the relay apparatus 120 and between the relay apparatus 120 and the receiving apparatus 110.

In S1107, the control portion 102 judges whether directional communication via the relay apparatus 120 is possible or not. Specifically, the control portion 102 judges whether there is a combination of transmission/reception directions with a predetermined receiving sensitivity or a predetermined or higher SN value between the image pickup apparatus 100 and the relay apparatus 120 and between the relay apparatus 120 and the receiving apparatus 110, based on a result of the transmission/reception direction search. If directional communication via the relay apparatus 120 is possible, the flow proceeds to S1108. If directional communication via the relay apparatus 120 is not possible, the flow proceeds to S1109. In S1108, the control portion 102 performs directional communication via the relay apparatus 120. In S1109, the control portion 102 performs data communication by omni-directional communication.

Figure 12A:
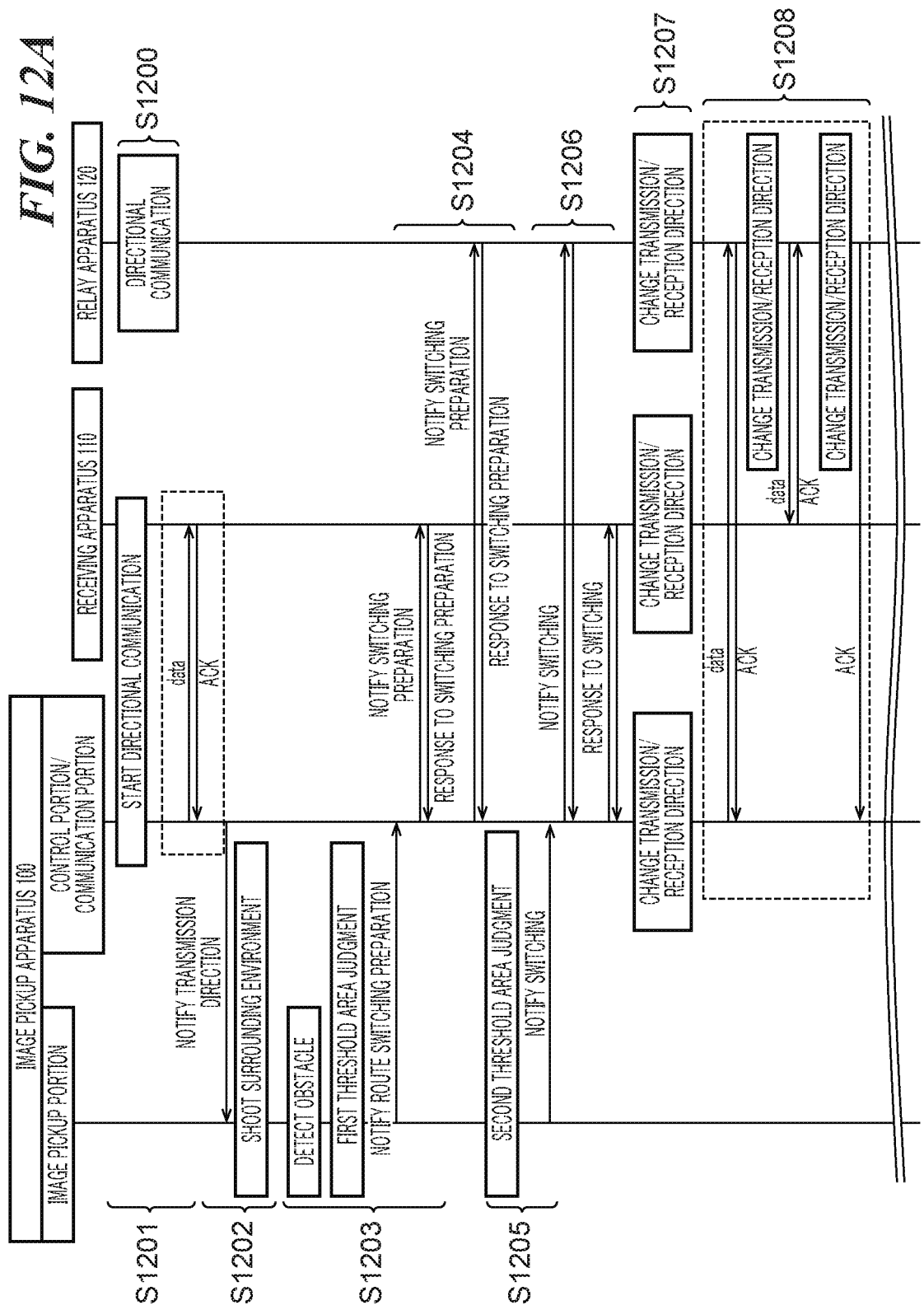

FIGS. 12A and 12B are flowcharts showing an example of a process for switching to a communication route via the relay apparatus 120 when an obstacle blocks a communication route, which is realized by the control portions 102, 112 and 122 executing the programs stored in the storage portions 103, 113 and 123. The process of FIGS. 12A and 12B is started by directional communication being performed between the image pickup apparatus 100 and the receiving apparatus 110.

Figure 9C:
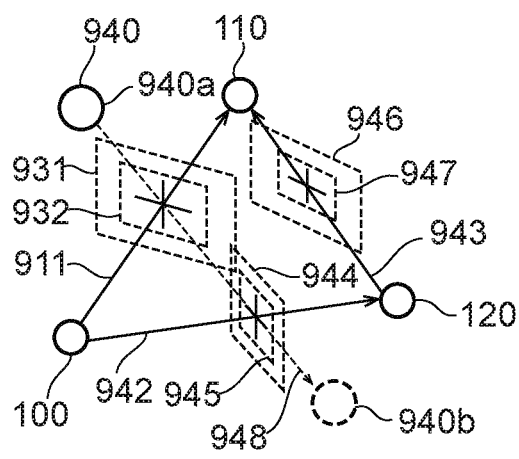

FIG. 9C shows a positional relationship among the image pickup apparatus 100, the receiving apparatus 110 and the relay apparatus 120 arranged in free space, and an obstacle 940. A communication route 911 is a communication route by direct wave. A communication route 942-943 is a communication route through which directional communication is possible between the image pickup apparatus 100 and the receiving apparatus 110 via the relay apparatus 120. The obstacle 940 moves from a position 940a to a position 940b. A broken line 948 indicates a movement route of the obstacle 940, which crosses the communication routes 911 and 942. In a surrounding environment shot by the image pickup apparatus 100, image pickup areas including the communication routes 911, 942 and 943 are image pickup areas 931, 944 and 946, respectively.

In S1200, the image pickup apparatus 100 starts data communication by directional communication with the receiving apparatus 110. It should be noted that it is already judged that the relay apparatus 120 can perform directional communication with the image pickup apparatus 100. That is, it is shared beforehand that the relay apparatus 120 relays directional communication between the image pickup apparatus 100 and the receiving apparatus 110, and relay conditions applied at the time of relaying are already notified from the image pickup apparatus 100. The relay apparatus 120 notified of the relay conditions waits for directional communication in a reception direction notified from the image pickup apparatus 100. The relay apparatus 120, however, may wait immediately before a relay operation to be described later. In S1201, the control portion 102 of the image pickup apparatus 100 controls the wireless communication portion 101 to transmit image data (data). On the other hand, the receiving apparatus 110 transmits a receiving completion response (ACK) to the image pickup apparatus 100 when receiving the image data.

In S1202, the control portion 102 notifies the image pickup portion 104 of a transmission/reception direction and a directivity width for directional communication through the selected communication route. The image pickup portion 104 changes an image pickup range so that the notified transmission/reception direction and directivity width are within an image pickup angle of view and shoots a surrounding environment. In S1203, the obstacle 940 enters the image pickup area 931, and, thereby, the moving body judging portion 407 detects the obstacle 940 in the image pickup area 931. This process is similar to the process of S1003 to S1004 stated above. Further, the moving body judging portion 407 performs threshold area judgment about the obstacle 940 on the image pickup area 931 and judges whether the obstacle 940 has advanced into the first threshold area 932 or not, that is, the obstacle 940 has entered the first threshold area 932 or not. If the obstacle 940 has entered the first threshold area 932, the moving body judging portion 407 notifies the control portion 102 of communication route switching preparation.

In S1204, when receiving the notification from the moving body judging portion 407 of the image pickup portion 104, the control portion 102 notifies the receiving apparatus 110 and the relay apparatus 120 of communication route switching preparation via the wireless communication portion 101. When receiving the switching preparation notification, each of the receiving apparatus 110 and the relay apparatus 120 notifies the image pickup apparatus 100 of a response to the switching preparation. In the case of notifying the relay apparatus 120 of switching preparation or receiving a response to the switching preparation from the relay apparatus 120, the control portion 102 controls the wireless communication portion 101 to change the transmission/reception direction of the directional transmission antenna and the directional receiving antenna to a transmission/reception direction corresponding to the communication route 942. In S1205, the moving body judging portion 407 judges whether the obstacle 940 has advanced into the second threshold area 933 or not, that is, whether the obstacle 940 has entered the second threshold area 933 or not. If the obstacle 940 has entered the second threshold area 933, the moving body judging portion 407 notifies the control portion 102 of communication route switching.

In S1206, when receiving the notification from the moving body judging portion 407 of the image pickup portion 104, the control portion 102 notifies the receiving apparatus 110 and the relay apparatus 120 of directional communication switching via the wireless communication portion 101. When receiving the switching notification, each of the receiving apparatus 110 and the relay apparatus 120 notifies the image pickup apparatus 100 of a response to the switching. In the case of notifying the relay apparatus 120 of switching or receiving a response to the switching from the relay apparatus 120, the control portion 102 controls the wireless communication portion 101 to change the transmission/reception direction of the directional transmission antenna, and the directional receiving antenna to a transmission/reception directions corresponding to the communication route 942. In S1207, the control portion 102 changes the transmission direction of the directional transmission antenna of the wireless communication portion 101 to a transmission direction corresponding to the communication route 942, with the switching notification to the receiving apparatus 110 and the relay apparatus 120 as a trigger. The control portion 112 of the receiving apparatus 110 changes the reception direction of the directional receiving antenna of the wireless communication portion 111 to a reception direction corresponding to the communication route 943. The control portion 122 of the relay apparatus 120 changes the reception direction of the directional receiving antenna of the wireless communication portion 121 to a reception direction corresponding to the communication route 942.

In S1208, the image pickup apparatus 100 and the receiving apparatus 110 perform data communication via the relay apparatus 120. Specifically, the image pickup apparatus 100 transmits image data (data) to the relay apparatus 120. When receiving the image data, the relay apparatus 120 transmits a receiving completion response (ACK) to the image pickup apparatus 100. Then, the control portion 122 of the relay apparatus 120 changes the transmission direction of the directional transmission antenna of the wireless communication portion 121 to a transmission direction corresponding to the communication route 943 and transmits the image data (data) received from the image pickup apparatus 100 to the receiving apparatus 110. When receiving the image data, the receiving apparatus 110 transmits a receiving completion response (ACK) to the relay apparatus 120. When the relay apparatus 120 receives the receiving completion response (ACK) from the receiving apparatus 110, the control portion 122 changes the transmission direction of the directional transmission antenna of the wireless communication portion 121 to the transmission direction corresponding to the communication route 942 and transmits a receiving completion response (ACK) to the image pickup apparatus 100. In the case of performing data communication from the image pickup apparatus 100 to the receiving apparatus 110 via the relay apparatus 120, the process of S1208 is repeated.

In S1209, the moving body judging portion 407 judges whether the obstacle 940 has advanced beyond the third threshold area 933 or not, that is, whether the obstacle 940 has completely exited the third threshold area 933 or not. If the obstacle 940 has exited the third threshold area 933, the moving body judging portion 407 notifies the control portion 102 of communication route switching preparation. In S1210, when receiving the notification from the moving body judging portion 407 of the image pickup portion 104, the control portion 102 notifies the relay apparatus 120 of communication route switching preparation via the wireless communication portion 101. Here, the control portion 102 notifies information about the communication route 942 selected before avoiding the obstacle 901. When receiving the switching preparation notification, the relay apparatus 120 notifies the image pickup apparatus 100 of a response to the switching preparation. Then, the control portion 122 of the relay apparatus 120 changes the transmission direction of the directional transmission antenna of the wireless communication portion 121 to a transmission direction corresponding to the communication route 943 and transmits the switching preparation notification received from the image pickup apparatus 100 to the receiving apparatus 110. The receiving apparatus 110 notifies the relay apparatus 120 of a response to the switching preparation. When the relay apparatus 120 receives the response to the switching preparation from the receiving apparatus 110, the control portion 122 changes the transmission direction of the directional transmission antenna of the wireless communication portion 121 to the transmission direction corresponding to the communication route 942 and transmits the response to the switching preparation received from the receiving apparatus 110 to the image pickup apparatus 100.

In S1211, the moving body judging portion 407 judges whether the obstacle 940 has advanced beyond the fourth threshold area 932 or not, that is, whether the obstacle 940 has completely exited the fourth threshold area 932 or not. 1f the obstacle 940 has exited the fourth threshold area 932, the moving body judging portion 407 notifies the control portion 102 of communication route switching. In 51212, when receiving the notification from the moving body judging portion 407 of the image pickup portion 104, the control portion 102 notifies the relay apparatus 120 of directional communication switching via the wireless communication portion 101. When receiving the switching notification, the relay apparatus 120 notifies the image pickup apparatus 100 of a response to the switching. Then, the control portion 122 of the relay apparatus 120 changes the transmission direction of the directional transmission antenna of the wireless communication portion 121 to a transmission direction corresponding to the communication route 943 and transmits the switching notification received from the image pickup apparatus 100 to the receiving apparatus 110. The receiving apparatus 110 notifies the relay apparatus 120 of a response to the switching. When the relay apparatus 120 receives the response to the switching from the receiving apparatus 110, the control portion 122 changes the transmission direction of the directional transmission antenna of the wireless communication portion 121 to the transmission direction corresponding to the communication route 942 and transmits the response to the switching received from the receiving apparatus 110 to the image pickup apparatus 100.

In S1213, the control portion 102 changes the transmission direction of the directional transmission antenna of the wireless communication portion 101 to a transmission direction corresponding to the communication route 911, with the switching notification to the receiving apparatus 110 and the relay apparatus 120 as a trigger. The control portion 112 of the receiving apparatus 110 changes the reception direction of the directional receiving antenna of the wireless communication portion 111 to a reception direction corresponding to the communication route 911. In S1214, the image pickup apparatus 100 and the receiving apparatus 110 continue data communication until the directional communication ends. It should be noted that, though description has been made on the case where, in response to the obstacle 940 exiting the fourth threshold area 932, switching is performed to return the communication route to the communication route 911 here, directional communication may be continued through the communication route 942-943 even after the obstacle 940 exits the fourth threshold area 932.

Further, even if the obstacle 940 enters the image pickup area 944 or 946 when directional communication is being performed with the communication route 942 being selected, communication route switching can be similarly performed by the process from S1203 to S1213. Though description has been made on the case where the communication route is switched between two routes, that is, the communication route 911 by direct wave and a communication route via the relay apparatus 120 here, communication routes to be switched to may include not only the communication route 911 by direct wave but also a communication route by reflected wave. Further, the case is not limited to the case of a communication route via one relay apparatus 120, but a plurality of communication routes via a plurality of relay apparatuses 120 may be included. In this case, the image pickup apparatus 100 sets priorities for switching candidate communication routes between the image pickup apparatus 100 and the relay apparatus 120, and the receiving apparatus 110 sets priorities for switching candidate communication routes between the receiving apparatus 110 and the plurality of relay apparatuses 120. Each of the image pickup apparatus 100 and the receiving apparatus 110 can switch to a communication route to a common relay apparatus 120 with a higher priority. Further, similarly to the first embodiment, the priorities can be set not only based on communication quality evaluation values but also in consideration of arrangement priorities at the time of an obstacle moving. Further, the present embodiment is not limited to the case where there is one obstacle but may be applied even if there are a plurality of obstacles.

If the moving body judging portion 407 can predict a movement route of an obstacle and judge a communication route that will be blocked beforehand, notification of switching preparation may be omitted. Further, if the relay apparatus 120 shares relay conditions beforehand, the switching preparation notification may be omitted. Further, though description has been made on the case of switching a communication route according to the obstacle 940 here, the present embodiment is applicable to directional communication using an obstacle as a reflection surface. That is, by the image pickup portion 104 shooting a surrounding environment to detect an obstacle as a reflection surface, and switching a communication route when the reflection surface has exceeded a predetermined threshold area, it is possible to avoid directional communication from being disconnected. Further, if the relay apparatus 120 is provided with the image pickup portion 125, a shot image shot by the image pickup portion 12 of of the relay apparatus 120 may be used to detect an obstacle or perform threshold area judgment. However, if an image pickup area of the image pickup apparatus 100 overlaps with an image pickup area of the relay apparatus 120, detection of an obstacle and threshold area judgment may be performed without using a shot image shot by the image pickup portion 125 of the relay apparatus 120.

Thus, according to the present embodiment, the control portion 102 switches to a communication route via the relay apparatus 120 according to environmental changes. Since a communication route via the relay apparatus 120 is not influenced by a size or surface roughness of a reflection surface, communication quality can be improved. Further, in the case of switching from a communication route via the relay apparatus 120 to a communication route not via the relay apparatus 120, it is possible to, by making a notification of switching the communication route through the communication route via the relay apparatus 120, switch the communication route to the communication route not via the relay apparatus 120.

Fourth Embodiment

In a fourth embodiment, description will be made on a process in the case of using the image pickup apparatus 100 as a relay apparatus. That is, wireless communication is performed by relaying the wireless communication from the transmission apparatus 130 to the receiving apparatus 110 via the image pickup apparatus 100. When the image pickup apparatus 100 detects an obstacle, a communication route via the image pickup apparatus 100 is switched to a communication route not via the image pickup apparatus 100 to avoid the communication route from being blocked by the obstacle. It should be noted that description will be made on the assumption that the transmission apparatus 130 is in a configuration similar to that of the relay apparatus 120.

Figure 9D:
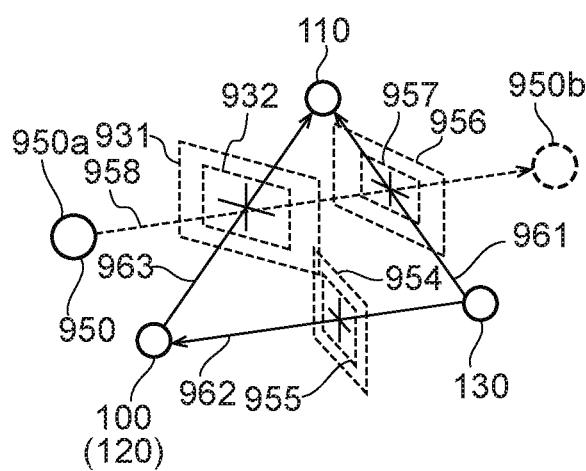

FIG. 9D shows a positional relationship among the image pickup apparatus 100, the receiving apparatus 110 and the transmission apparatus 130 arranged in free space, and an obstacle 950. A communication route 961 is a communication route by direct wave from the transmission apparatus 130 to the receiving apparatus 110. A communication route 962-963 is a communication route through which directional communication is possible between the transmission apparatus 130 and the receiving apparatus 110 via the image pickup apparatus 100. The obstacle 950 moves from a position 950a to a position 950b. A broken line 958 indicates a movement route of the obstacle 950, which crosses the communication routes 963 and 961. In a surrounding environment shot by the image pickup apparatus 100, image pickup areas including the communication routes 963, 962 and 961 are image pickup areas 931, 954 and 956, respectively.

Figure 13B:
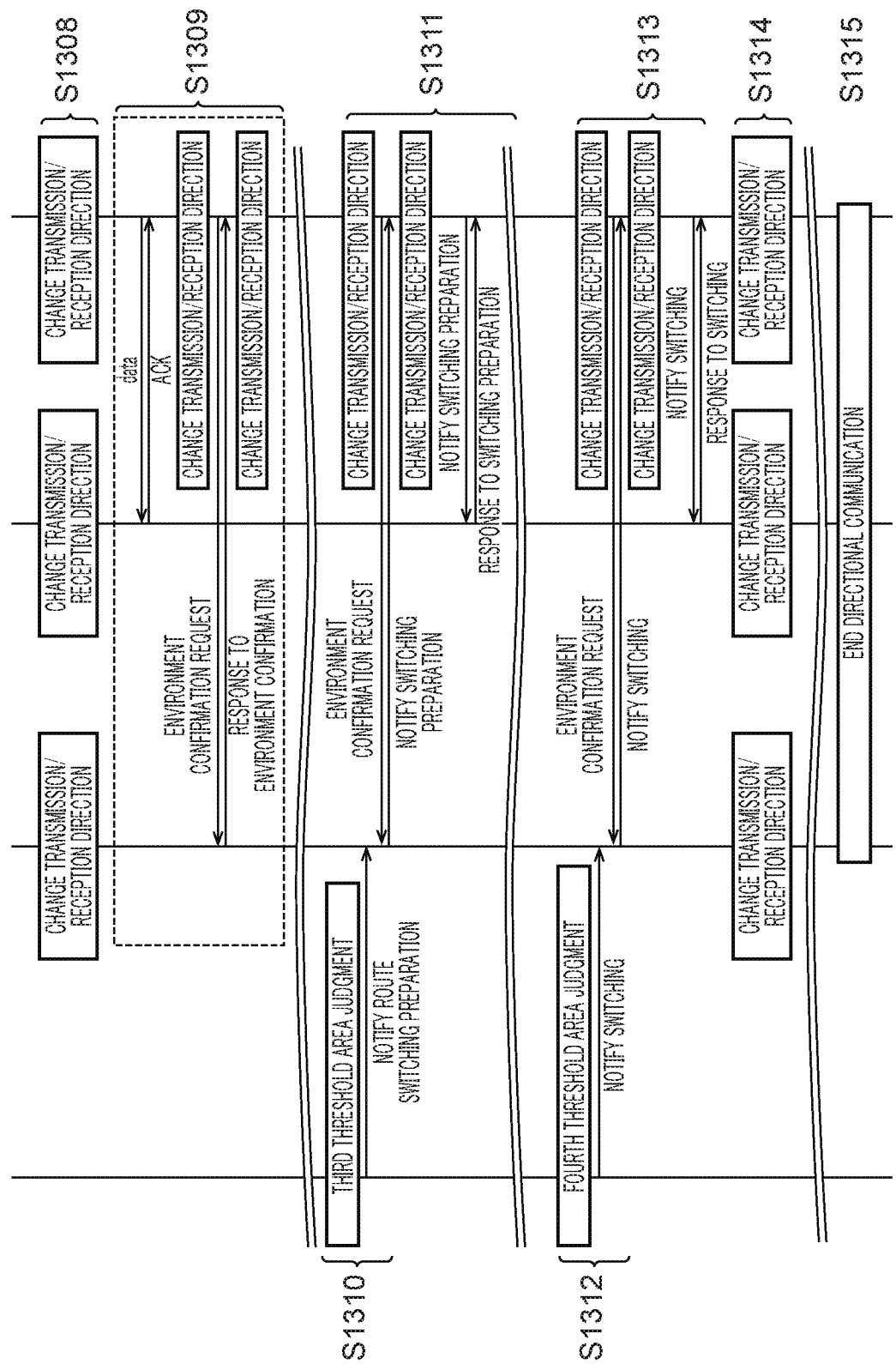

FIGS. 13A and 13B are flowcharts showing an example of a process for switching a communication route at the time of the obstacle 950 blocking a communication route via the image pickup apparatus 100, which is realized by the control portions 102, 112 and 122 executing the programs stored in the storage portions 103, 113 and 123. The process of FIGS. 13A and 13B is started by directional communication via the image pickup apparatus 100 being performed between the transmission apparatus 130 and the receiving apparatus 110. In S1301, the control portion 102 of the image pickup apparatus 100 starts relay from the transmission apparatus 130. In S1302, the control portion 102, notifies the image pickup portion 104 of a transmission/reception direction and a directivity width for directional communication through a selected communication route by starting relay. The image pickup portion 104 changes an image pickup range so that the notified transmission/reception direction and directivity width are within an image pickup angle of view and shoots a surrounding environment.

In S1303, the transmission apparatus 130 and the receiving apparatus 110 perform data communication via the image pickup apparatus 100. It should be noted that the image pickup apparatus 100 judges beforehand that directional communication with the transmission apparatus 130 is possible. That is, it is shared beforehand that the image pickup apparatus 100 relays directional communication between the transmission apparatus 130 and the receiving apparatus 110, and relay conditions applied at the time of relaying are already notified from the transmission apparatus 130. The transmission apparatus 130 transmits image data (data) to the image pickup apparatus 100. The image pickup apparatus 100 transmits a receiving completion response (ACK) to the transmission apparatus 130 when receiving the image data. Then, the control portion 102 of the image pickup apparatus 100 changes the transmission direction of the directional transmission antenna of the wireless communication portion 101 to a transmission direction corresponding to the communication route 963 and transmits the image data (data) received from the transmission apparatus 130 to the receiving apparatus 110. The receiving apparatus 110 transmits a receiving completion response (ACK) to the image pickup apparatus 100 when receiving the image data. When the image pickup apparatus 100 receives the receiving completion response (ACK) receiving completion (ACK) from the receiving apparatus 110, the control portion 102 changes the transmission direction of the directional transmission antenna of the wireless communication portion 101 to a transmission direction corresponding to the communication route 962 and transmits a receiving completion response (ACK) to the transmission apparatus 130. In the case of performing data communication from the transmission apparatus 130 to the receiving apparatus 110 via the image pickup apparatus 100, the process of S1303 is repeated.

In S1304, the obstacle 950 enters the image pickup area 931, and, thereby, the moving body judging portion 407 detects the obstacle 950 in the image pickup area 931. This process is similar to the process of S1003 to S1004 stated above. Further, the moving body judging portion 407 performs threshold area judgment about the obstacle 950 on the image pickup area 931 and judges whether the obstacle 950 has advanced into the first threshold area 932 or not, that is, the obstacle 950 has entered the first threshold area 932 or not. If the obstacle 950 has entered the first threshold area 932, the moving body judging portion 407 notifies the control portion 102 of communication route switching preparation.

In S1305, when receiving the notification from the moving body judging portion 407 of the image pickup portion 104, the control portion 102 notifies the transmission apparatus 130 of directional communication switching preparation via the wireless communication portion 101. When receiving the switching preparation notification, the transmission apparatus 130 notifies the image pickup apparatus 100 of a response to the switching preparation. Then, the control portion 102 of the image pickup apparatus 100 changes the transmission direction of the directional transmission antenna of the wireless communication portion 101 to a transmission direction corresponding to the communication route 963 and notifies the receiving apparatus 110 of directional communication switching preparation. When receiving the switching preparation notification, the receiving apparatus 110 notifies the image pickup apparatus 100 of a response to the switching preparation. When receiving the response to the switching preparation, the control portion 102 of the image pickup apparatus 100 changes the reception direction of the directional receiving antenna of the wireless communication portion 101 to a reception direction corresponding to the communication route 962 to prepare for receiving data from the transmission apparatus 130.

In S1306, the moving body judging portion 407 judges whether the obstacle 950 has advanced into the second threshold area 933 or not, that is, whether the obstacle 950 has entered the second threshold area 933 or not. If the obstacle 950 has entered the second threshold area 933, the moving body judging portion 407 notifies the control portion 102 of communication route switching. In S1307, when receiving the notification from the moving body judging portion 407 of the image pickup portion 104, the control portion 102 notifies the transmission apparatus 130 of directional communication switching via the wireless communication portion 101. When receiving the switching notification, the transmission apparatus 130 notifies the image pickup apparatus 100 of a response to the switching. Then, the control portion 102 of the image pickup apparatus 100 changes the transmission direction of the directional transmission antenna of the wireless communication portion 101 to a transmission direction corresponding to the communication route 963 and notifies the receiving apparatus 110 of communication route switching.

In S1308, the control portion 102 changes the transmission direction of the directional transmission antenna of the wireless communication portion 101 to the transmission direction corresponding to the communication route 962, with the switching notification as a trigger. The control portion 112 of the receiving apparatus 110 changes the reception direction of the directional receiving antenna of the wireless communication portion 111 to a reception direction corresponding to the communication route 961. The control portion 122 of the transmission apparatus 130 changes the transmission direction of the directional transmission antenna of the wireless communication portion 121 to a transmission direction corresponding to the communication route 961.

In S1309, the transmission apparatus 130 and the receiving apparatus 110 perform data communication by directional communication in a state in which the image pickup apparatus 100 continues shooting of the surrounding environment. Specifically, the control portion 122 of the transmission apparatus 130 controls the wireless communication portion 121 to transmit image data. (data), and the receiving apparatus 110 transmits a receiving completion response (ACK) to the transmission apparatus 130 when receiving the image data. Then, the control portion 122 of the transmission apparatus 130 changes the transmission direction of the directional transmission antenna of the wireless communication portion 121 to a transmission direction corresponding to the communication route 962 and transmits an environment confirmation request to the image pickup apparatus 100. When receiving the environment confirmation request, the image pickup apparatus 100 transmits an environment confirmation response to the transmission apparatus 130. In the case where data communication is performed from the transmission apparatus 130 to the receiving apparatus 110 while the image pickup apparatus 100 is shooting the surrounding environment, the process of S1309 is repeated.

In S1310, the moving body judging portion 407 judges whether the obstacle 950 has advanced beyond the third threshold area 933 or not, that is, whether the obstacle 950 has completely exited the third threshold area 933 or not. If the obstacle 950 has exited the third threshold area 933, the moving body judging portion 407 notifies the control portion 102 of communication route switching preparation. In 51311, when receiving the notification from the moving body judging portion 407 of the image pickup portion 104, the control portion 102 waits for an environment confirmation request from the transmission apparatus 130. The control portion 122 of the transmission apparatus 130 changes the transmission direction of the directional transmission antenna of the wireless communication portion 121 to a transmission direction corresponding to the communication route 962 and transmits an environment confirmation request to the image pickup apparatus 100. When receiving the environment confirmation request, the image pickup apparatus 100 notifies the transmission apparatus 130 of switching preparation. The control portion 122 of the transmission apparatus 130 changes the transmission direction of the directional transmission antenna of the wireless communication portion 121 to a transmission direction corresponding to the communication route 961 and notifies the receiving apparatus 110 of switching preparation. When receiving the switching preparation notification, the receiving apparatus 110 notifies the transmission apparatus 130 of a response to the switching preparation.

In S1312, the moving body judging portion 407 judges whether the obstacle 950 has advanced beyond the fourth threshold area 932 or not, that is, whether the obstacle 950 has completely exited the fourth threshold area 932 or not. If the obstacle 950 has exited the fourth threshold area 932, the moving body judging portion 407 notifies the control portion 102 of communication route switching. In S1313, when receiving the notification from the moving body judging portion 407 of the image pickup portion 104, the control portion 102 waits for an environment confirmation request from the transmission apparatus 130. The control portion 122 of the transmission apparatus 130 changes the transmission direction of the directional transmission antenna of the wireless communication portion 121 to a transmission direction corresponding to the communication route 962 and transmits an environment confirmation request to the image pickup apparatus 100. When receiving the environment confirmation request, the image pickup apparatus 100 notifies the transmission apparatus 130 of communication route switching. The control portion 122 of the transmission apparatus 130 changes the transmission direction of the directional transmission antenna of the wireless communication portion 121 to a transmission direction corresponding to the communication route 961 and notifies the receiving apparatus 110 of communication route switching. When receiving the switching notification, the receiving apparatus 110 transmits a response to the switching to the transmission apparatus 130.

In S1314, the control portion 102 changes the reception direction of the directional receiving antenna of the wireless communication portion 101 to a reception direction corresponding to the communication route 962, with the switching notification as a trigger. The control portion 112 of the receiving apparatus 110 changes the reception direction of the directional receiving antenna of the wireless communication portion 111 to a reception direction corresponding to the communication route 963. The control portion 122 of the transmission apparatus 130 changes the transmission direction of the directional transmission antenna of the wireless communication portion 121 to a transmission direction corresponding to the communication route 962. In S1315, the image pickup apparatus 100 and the receiving apparatus 110 continue data communication similarly to the process of S1303 until directional communication via the relay apparatus 120 ends.

It should be noted that, though description has been made on the case where, in response to the obstacle 950 exiting the fourth threshold area 932, switching is performed to return the communication route to the communication route 962-963 here, the directional communication may be continued through the communication route 961 even after the obstacle 950 exits the fourth threshold area 932. Further, even if the obstacle 950 enters an image pickup area 957 when directional communication is being performed with the communication route 961 being selected, communication route switching can be similarly performed by the process from S1302 to S1314. Further, even if the obstacle 950 enters the image pickup area 954 when directional communication is being performed with the communication route 962 being selected, communication route switching can be similarly performed by the process from S1302 to S1314. Though description has been made on the case where the communication route is switched between two communication routes, that is, the communication route 961 by direct wave and a communication route via the image pickup apparatus 100 here, communication routes to be switched to may include not only the communication route 961 by direct wave and also a communication route by reflected wave. Further, the case is not limited to the case of a communication route via one relay apparatus 120, but a plurality of communication routes via a plurality of relay apparatuses 120 may be included. Further, the present embodiment is not limited to the case where there is one obstacle but may be applied even when there are a plurality of obstacles.

Though description has been made on the case of detecting the obstacle 950 by the image pickup portion 104 of the image pickup apparatus 100, the image pickup apparatus 100 and the relay apparatus 120 may be exchanged with each other to detect the obstacle 950 by the image pickup portion 125 of the relay apparatus 120. If the moving body judging portion 407 can predict a movement route of the obstacle 950 and judge a communication route that will be blocked beforehand, notification of switching preparation may be omitted. Further, though description has been made on the case of switching a communication route according to the obstacle 950 here, the present embodiment is applicable to directional communication using an obstacle as a reflection surface. That is, by the image pickup portion 104 shooting a surrounding environment to detect an obstacle as a reflection surface, and switching a communication route when the reflection surface has exceeded a predetermined threshold area, it is possible to avoid directional communication from being disconnected.

Fifth Embodiment

In a fifth embodiment, description be made on a process for re-setting switching candidate communication routes when a surrounding environment changes.

Figure 14A:
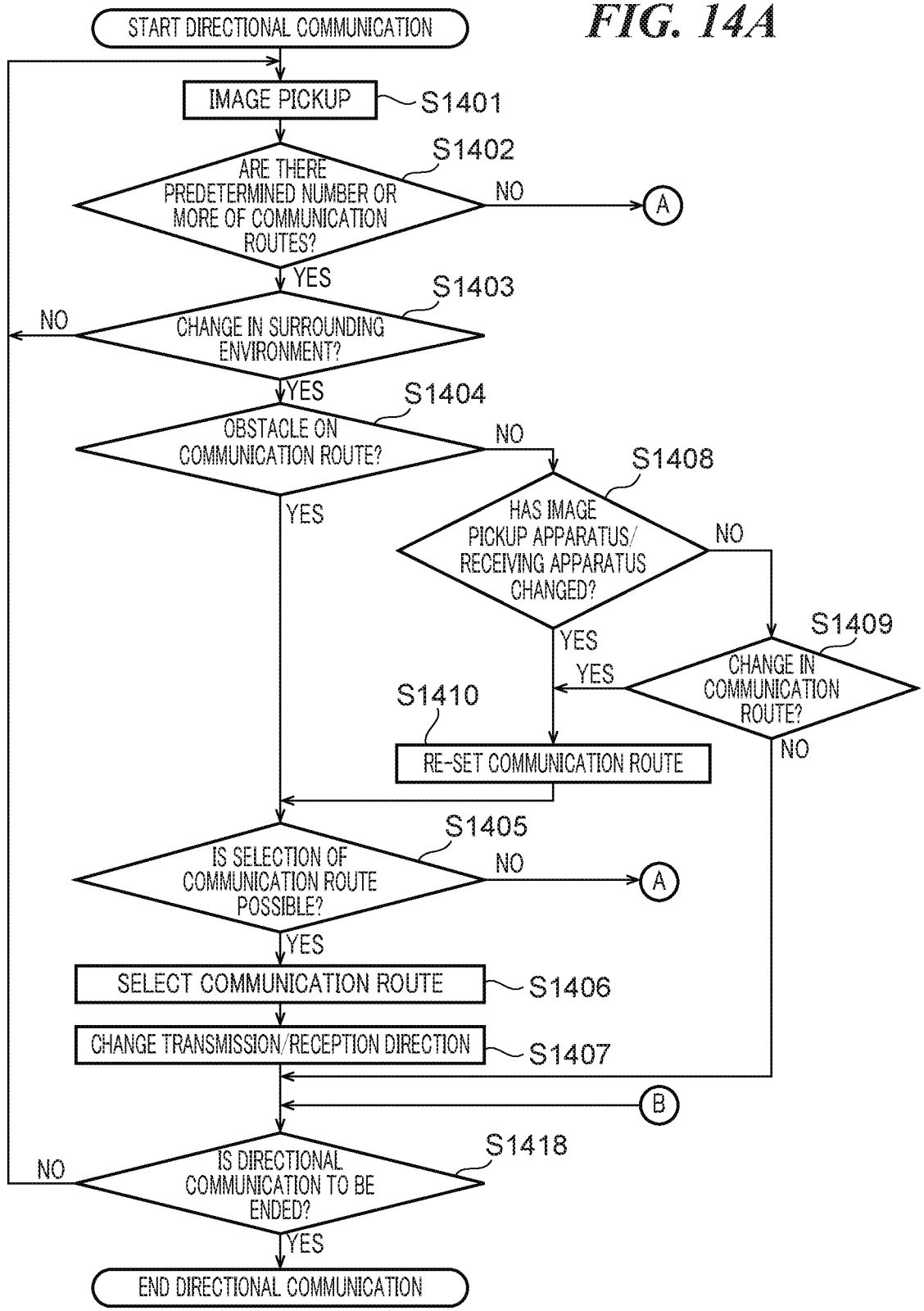
FIGS. 14A and 14B are flowcharts showing a process performed in a case where a surrounding environment changes.
Figure 14B:
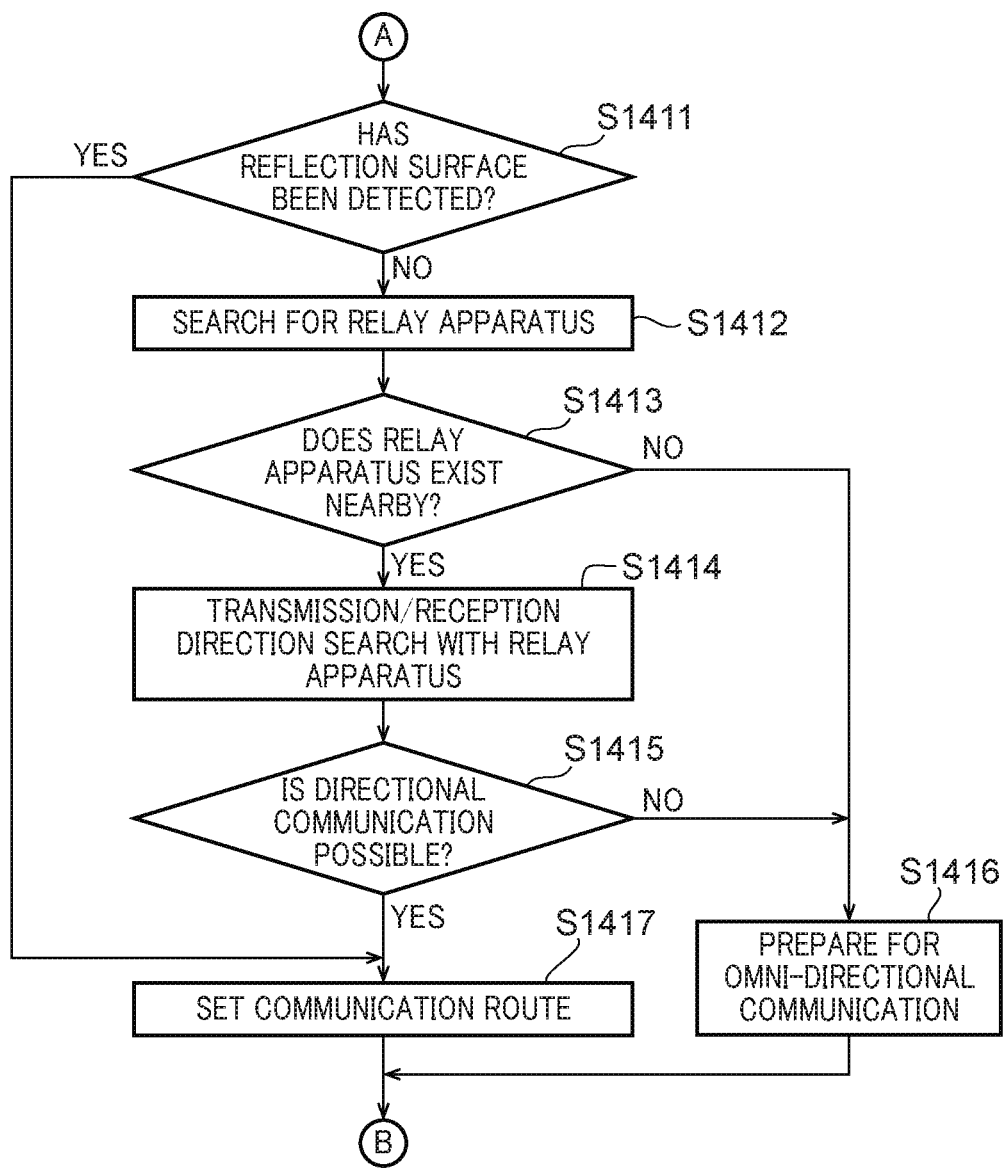

FIGS. 14A and 14B are flowcharts showing an example of a process performed in a case where a surrounding environment changes when directional communication is being performed, which is realized by the control portion 102 executing the program stored in the storage portion 103. Further, the process of FIGS. 144 and 14B is started by directional communication between the image pickup apparatus 100 and the receiving apparatus 110 being performed.

In S1401, the image pickup portion 104 of the image pickup apparatus 100 starts image pickup of a surrounding environment. In S1402, the control portion 102 of the image pickup apparatus 100 judges whether or not there are a predetermined number or more of switching candidate communication routes. The control portion 102 judges whether or not there are a predetermined number or more of switching candidate communication routes, by counting the number of switching candidate communication routes. If there are not a predetermined number or more of switching candidate communication routes, the flow proceeds to S1411. If there are a predetermined number or more of switching candidate communication routes, the flow proceeds to S1403. In S1403, the control portion 102 judges whether there is a change in the surrounding environment or not. Specifically, the control portion 102 judges whether there is a predetermined amount or more of change or not from a shot image of the surrounding environment shot by the image pickup portion 104. If there is a predetermined amount or ore of change, the flow proceeds to S1404. If not, the flow returns to S1401.

In S1404, the control portion 102 judges whether or not the moving body judging portion 407 has detected an obstacle in an image pickup area in which a currently selected communication route is shot. If an obstacle has been detected, the flow proceeds to S1405. If not, the flow proceeds to S1408. In S1405, the control portion 102 judges whether or not there is a communication route that can be selected in a current state of the surrounding environment among the switching candidate communication routes. If there is not a communication route that can be selected, the flow proceeds to S1411. If there is a communication route that can be selected, the flow proceeds to S1406.

In S1406, the control portion 102 selects a communication route from among the switching candidate communication routes and confirms whether it is actually possible to perform directional communication or not by a transmission/reception direction search. Here, the control portion 102 selects a communication route from among the switching candidate communication routes in ascending order of set priorities and confirms the communication route. Further, the control portion 102 searches for a combination of transmission/reception directions in which directional communication is the most possible in the selected communication route, around the selected communication route using the second transmission/reception direction search. At this time, by the control portion 102 performing the transmission/reception direction search between data communications by directional communication, data communication between the image pickup apparatus 100 and the receiving apparatus 110 is continued. In S1407, the control portion 102 switches the communication route. Specifically, the control portion 102 updates the communication route so that the transmission/reception direction in which directional communication is the most possible is obtained, using the second transmission/reception direction search, and switches to the updated communication route.

In S1408, the control portion 102 judges whether or not the change in the surrounding environment is a change in an attitude or position of the image pickup apparatus 100 or the receiving apparatus 110. The control portion 102 can judge whether the attitude or position of the image pickup apparatus 100 or the receiving apparatus 110 has changed or not based on the shot image of the surrounding environment shot by the image pickup portion 104. Here, it is assumed that "the image pickup apparatus 100 or the receiving apparatus 110" means at least any one of the image pickup apparatus 100 and the receiving apparatus 110, and "the attitude or position" means at least any one of the attitude and the position. It should be noted that the control portion 102 may acquire information about a change in the attitude or position of the receiving apparatus 110 from the receiving apparatus 110 via wireless communication. If the attitude or position has changed, the flow proceeds to S1410. If neither the attitude nor the position has changed, the flow proceeds to S1409. In S1409, the control portion 102 judges whether or not there is a change in any switching candidate communication route. Here, when there is a change in any communication route, for example, it is assumed that, on a communication route by reflected wave among the switching candidate communication routes, an object to be a reflection surface has moved. If there is a change in any switching candidate communication route, the flow proceeds to S1410. If not, the flow proceeds to S1418.

In S1410, the control portion 102 re-calculates switching candidate communication routes and re-sets the switching candidate communication routes. That is, if the attitude or position of the image pickup apparatus 100 or the receiving apparatus 110 has changed, or if there is a change in the communication route, there is a strong possibility that, even if the switching candidate communication route is switched to, and directional communication is attempted, the directional communication cannot be maintained. Therefore, if the attitude or position of the image pickup apparatus 100 or the receiving apparatus 110 has changed, or if there is a change in any switching candidate communication route, the control portion 102 re-sets switching candidate communication routes. This process is similar to the process of S604 to S609 stated above. However, if it is possible to modify switching candidate communication routes based on information about a change in the attitude or position of the image pickup apparatus 100 or the receiving apparatus 110, the control portion 102 may set switching candidate communication routes without using the process of S604 to S609. Similarly, if it is possible to modify a switching candidate communication route based on information about a change in the switching candidate communication route, the control portion 102 can set the switching candidate communication route without using the process of S604 to S609. For example, in the case of setting a communication route by direct wave when a position of the image pickup apparatus 100 or the like has merely changed, the control portion 102 may set the switching candidate communication route by correcting the communication route by direct wave by an amount corresponding to an amount of change of the image pickup apparatus 100 or the like.

In S1411, the control portion 102 judges whether the environment detecting portion 409 has detected a reflection surface or not. A process for the environment detecting portion 409 to detect a reflection surface is similar to the process of S501 to S504 stated above. If a reflection surface is detected, the flow proceeds to S1417. If a reflection surface cannot be detected, the flow proceeds to S1412. For example, in an outdoor environment and the like, a reflection surface is not detected because a reflection surface does not exist. In S1412, the control portion 102 searches for the relay apparatus 120. For example, the control portion 102 controls the wireless communication portion 101 to search for the relay apparatus 120 by omni-directional communication. In S1413, the control portion 102 judges whether the relay apparatus 120 exists or not. If the relay apparatus 120 exists, the flow proceeds to S1414. If not, the flow proceeds to S1416.

In S1414, the control portion 102 performs a transmission reception direction search between the control portion 102 and the relay apparatus 120. In S1415, the control portion 102 judges whether directional communication with the relay apparatus 120 is possible or not. If directional communication is possible, the flow proceeds to S1417. If not, the flow proceeds to S1416. In S1416, the control portion 102 prepares for performing wireless communication with the receiving apparatus 110 by omni-directional communication. For example, if a communication route of directional communication is blocked by an obstacle, the control portion 102 prepares for switching the wireless communication portion 101 to omni-directional communication because no switching candidate communication route exists.

In S1417, the control portion 102 newly sets a switching candidate communication route. Specifically, the control portion 102 extracts roughly estimated communication routes using the reflection surface detected in S1411 and newly sets a switching candidate communication route based on the extracted communication routes. This process is similar to the process of S604 to S609 stated above. Further, based on a result of performing the transmission/reception direction search between the control portion 102 and the relay apparatus 120 in S1414, the control portion 102 sets a communication route via the relay apparatus 120 as a switching candidate. In S1418, the control portion 102 judges whether or not to end the directional communication. In response to omni-directional communication being selected or data transmission by directional communication being ended by the user, the control portion 102 ends directional communication. If the directional communication is not to be ended, the flow returns to S1401, and the process stated above is repeated until the directional communication ends.

Figure 15:
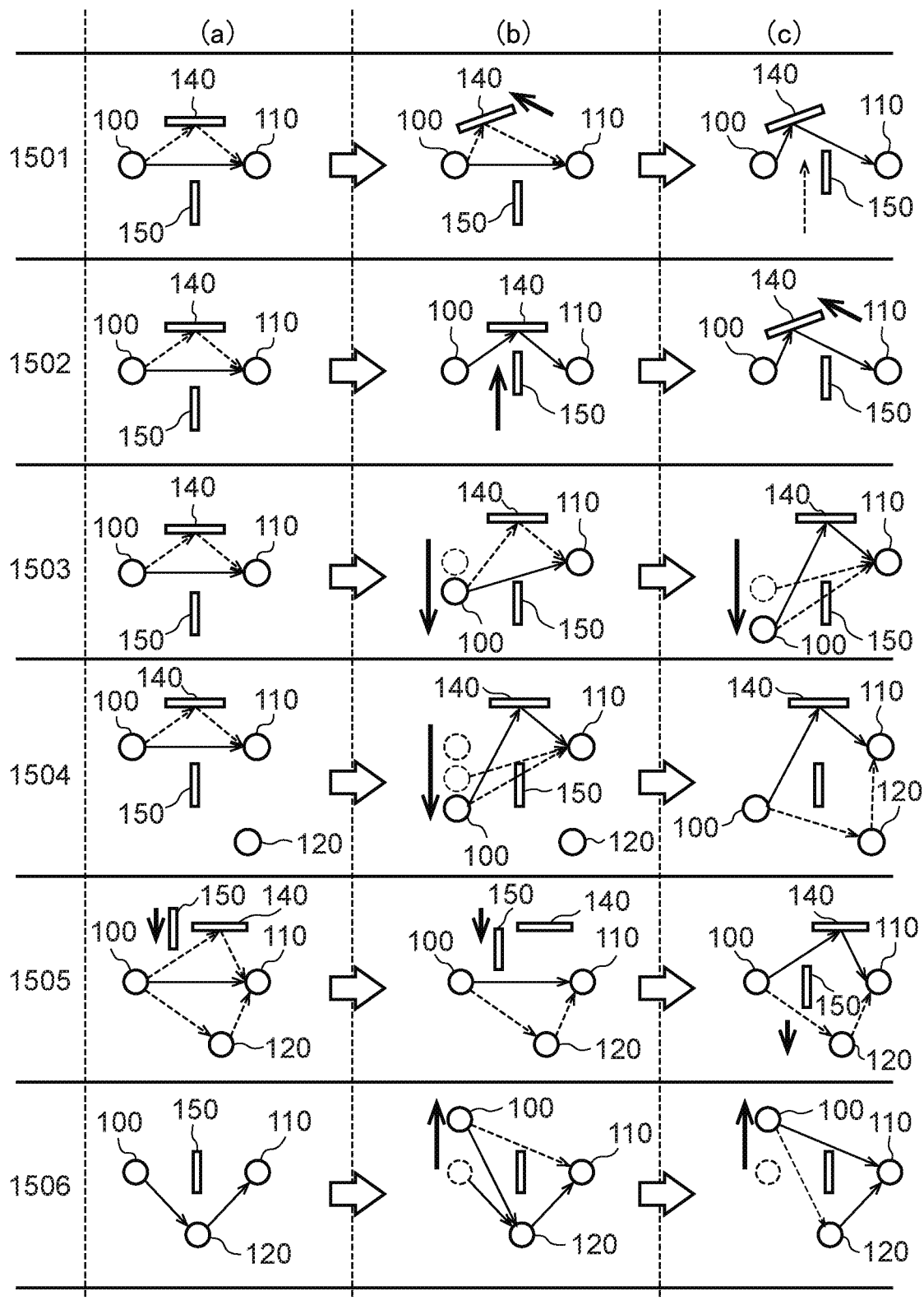
FIG. 15 is a schematic view showing cases of switching a communication route.

FIG. 15 illustrates an example of specifically switching a communication route.

Here, solid line arrows shown in FIG. 15 indicate selected communication routes. Broken lines indicate switching candidate communication routes that can be selected. Bold arrows indicate movement directions of objects which have moved. Solid line objects indicate current positions, and broken line objects indicate past positions. Schematic diagrams of each of 1501 to 1506 show that time changes along horizontal axes (a)-(b)-(c) from left to right.

In 1501(*a*), directional communication is being performed through a communication route by direct wave, from the image pickup apparatus 100 to the receiving apparatus 110. As a switching candidate communication route, a communication route by reflected wave using a reflecting object 140 is set. In 1501(*b*), the reflecting object 140 moves in a direction of a bold arrow, and the image pickup apparatus 100 detects the movement of the reflecting object 140. Since there is a change in the communication route, the image pickup apparatus 100 re-calculates the switching candidate communication route to re-set a switching candidate communication route. In 1501(*c*), since an obstacle 150 moves, the image pickup apparatus 100 switches the communication route to the communication route by reflected wave via the reflecting object 140.

In 1502(*a*), directional communication is being performed through a communication route by direct wave, from the image pickup apparatus 100 to the receiving apparatus 110. As a switching candidate communication route, a communication route by reflected wave using the reflecting object 140 is set. In 1502(*b*), since the obstacle 150 moves in a direction of a bold arrow, the image pickup apparatus 100 switches the communication route to the communication route by reflected wave using the reflecting object 140. After that, in 1502(*c*), the reflecting object 140 moves in a direction of a bold arrow, and the image pickup apparatus 100 detects the movement of the reflecting object 140. By re-calculating the transmission/reception direction according to the detected movement of the reflecting object 140 and re-setting a switching candidate communication route, the image pickup apparatus 100 maintains the wireless communication.

In 1503(*a*), directional communication is being performed through a communication route by direct wave, from the image pickup apparatus 100 to the receiving apparatus 110. As a switching candidate communication route, a communication route by reflected wave using a reflecting object 140 is set. In 1503(*b*), the image pickup apparatus 100 moves in a direction of a bold arrow, and the image pickup apparatus 100 detects the movement of the image pickup apparatus 100 from a shot surrounding environment. By re-calculating the transmission/reception direction according to the detected positional change and re-setting a switching candidate communication route, the image pickup apparatus 100 maintains the wireless communication. At the same time, the image pickup apparatus 100 re-calculates a communication route by reflected wave using the reflecting object 140 and re-sets a switching candidate communication route. At this time, the obstacle 150 does not move. After that, in 1503(*c*), the image pickup apparatus 100 continuously moves in a direction of a bold arrow. Accompanying the movement of the image pickup apparatus 100, the image pickup apparatus 100 detects the stationary obstacle 150 as an obstacle that has relatively moved in a direction of blocking the communication route. When the obstacle 150 exceeds a predetermined threshold area of an image pickup area, the image pickup apparatus 100 maintains the wireless communication by switching the communication route to the communication route by reflected wave using the reflecting object 140.

In 1504(*a*), directional communication is being performed through a communication route by direct wave, from the image pickup apparatus 100 to the receiving apparatus 110. As a switching candidate communication route, a communication route by reflected wave using a reflecting object 140 is set. It should be noted that the obstacle 150 and the relay apparatus 120 do not move. In 1504(*b*), the image pickup apparatus 100 moves in a direction of a bold arrow, and the image pickup apparatus 100 detects the movement of the image pickup apparatus 100 from a shot surrounding environment. By re-calculating the transmission/reception direction according to the detected positional change and re-setting a switching candidate communication route, the image pickup apparatus 100 maintains the wireless communication. At the same time, the image pickup apparatus 100 re-calculates a communication route by reflected wave using the reflecting object 140 and re-sets a switching candidate communication route. After that, accompanying the movement of the image pickup apparatus 100, the image pickup apparatus 100 detects the obstacle 150 as an obstacle. When the obstacle 150 exceeds a predetermined threshold area, the image pickup apparatus 100 maintains the wireless communication by switching the communication route to the communication route by reflected wave using the reflecting object 140. As shown in 1504(*c*). If there is no switching candidate communication route except for the communication route through which directional communication is being performed currently, the image pickup apparatus 100 starts extraction of roughly estimated communication routes for setting a new communication route. When the relay apparatus 120 is searched out by omni-directional communication, the image pickup apparatus 100 performs a transmission/reception direction search between the image pickup apparatus 100 and the relay apparatus 120, and judges whether directional communication is possible or not. If directional communication with the relay apparatus 120 is possible, the image pickup apparatus 100 instructs the receiving apparatus 110 to perform a transmission/reception direction search between the receiving apparatus 110 and the relay apparatus 120. If a communication route via the relay apparatus 120 is possible, the image pickup apparatus 100 newly sets the communication route via the relay apparatus 120 as a switching candidate communication route. It should be noted that, since the transmission/reception direction search is performed between data communications between the image pickup apparatus 100 and the receiving apparatus 110, data communication between the image pickup apparatus 100 and the receiving apparatus 110 is continued.

In 1505(*a*), directional communication is being performed through a communication route by direct wave, from the image pickup apparatus 100 to the receiving apparatus 110. As switching candidate communication routes, a communication route by reflected wave using the reflecting object 140 and a communication route via the relay apparatus 120 are set. The obstacle 150 is moving in a direction of a bold arrow. In 1505(*b*), since the obstacle 150 continuously moves in the direction of the bold arrow, the image pickup apparatus 100 judges that the communication route is blocked by the obstacle 150 and excludes the communication route by reflected wave using the reflecting object 140 from the switching candidate communication routes. In 1505(*c*), since the obstacle 150 continuously moves in the direction of the bold arrow, the image pickup apparatus 100 detects the obstacle 150 as an obstacle on the communication route. When detecting that the obstacle 150 has got out of the communication route by reflected wave using the reflecting object 140, the image pickup apparatus 100 sets the communication route by reflected wave using the reflecting object 140 as a switching candidate communication route again. When the obstacle 150 exceeds a predetermined threshold area, the image pickup apparatus 100 switches from the communication route by direct wave to the receiving apparatus 110 to the communication route by reflected wave using the reflecting object 140. Here, by predicting a movement route from the movement direction of the obstacle 150, the image pickup apparatus 100 judges that there is a strong possibility that the communication route using the relay apparatus 120 is blocked by the obstacle 150 later. Therefore, the image pickup apparatus 100 switches the communication route to the communication route by reflected wave using the reflecting object 140 which the obstacle 150 has already crossed.

In 1506 (*a*), directional communication is being performed through a communication route via the relay apparatus 120, from the image pickup apparatus 100 to the receiving apparatus 110. A communication route by direct wave from the image pickup apparatus 100 to the receiving apparatus 110 is blocked by the obstacle 150. That is, there is no switching candidate communication route except for the currently selected communication route. In 1506(*b*), the image pickup apparatus 100 moves in a direction of a bold arrow, and the image pickup apparatus 100 detects the movement of the image pickup apparatus 100 from a shot surrounding environment. By re-calculating the transmission/reception direction for communication with the relay apparatus 120, that is, re-calculating a reception direction of the relay apparatus 120 and a transmission direction of the image pickup apparatus 100 according to the detected positional change and re-setting a switching candidate communication route, the image pickup apparatus 100 maintains the wireless communication. It should be noted that the transmission/reception directions between the relay apparatus 120 and the receiving apparatus 110 are not changed. The image pickup apparatus 100 updates data to which the surrounding environment is mapped, based on the positional change detected from a shot image and the transmission direction to the relay apparatus 120, and adds a communication route by direct wave to the receiving apparatus 110 to a switching candidate communication route. In 1506(*c*), the image pickup apparatus 100 evaluates each of the communication route by direct wave to the receiving apparatus 110 and the communication route via the relay apparatus 120, and performs directional communication through the communication route by direct wave that is more appropriate for communication. The image pickup apparatus 100 notifies the receiving apparatus 110 of switching of the communication route via the relay apparatus 120 and switches the communication route.

As described above, according to the present embodiment, the control portion 102 sets a switching candidate communication route according to a change in a surrounding environment shot by the image pickup portion 104. Therefore, even if a communication route is blocked by an obstacle after a surrounding environment changes, for example, because the image pickup apparatus 100 or the receiving apparatus 110 moves, it is possible to switch to a communication route in consideration of the change in the surrounding environment. Therefore, wireless communication with the receiving apparatus 110 can be maintained. Further, it is possible to shorten search time for searching for a switching candidate communication route when a communication route is blocked by an obstacle and secure a data communication band and maintain favorable communication.

Though the present invention has been made above based on the preferred embodiments, the present invention is not limited to the embodiments stated above. Various embodiments within a range not departing from the spirit of the present invention are included in the present invention. Further, each of the embodiments stated above merely shows an embodiment of the present invention, and the embodiments can be appropriately combined.

In the embodiment stated above, description has been made on the case where, in the case of aiming to make it possible to maintain directional communication when a surrounding environment changes, a switching candidate communication route is set according to the change in the surrounding environment shot by an image pickup unit. However, in the case of dealing with achievement of an aim different from the above, the present invention is not limited to the case of setting a switching candidate communication route according to a change in a surrounding environment shot by an image pickup unit.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-176880, filed Sep. 14, 2017 which is hereby incorporated by reference wherein in its entirety.

What is claimed is:

1. A communication apparatus comprising:
a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication;
an image pickup unit configured to shoot a surrounding environment; and
a control unit configured to, before a communication route through which said communication unit is performing the wireless communication with the another communication apparatus is blocked, set a switching candidate communication route based on a shot image of the surrounding environment shot by said image pickup unit, and, if the communication route through which said communication unit is performing the wireless communication with the another communication apparatus is blocked, control the directivity of the wireless communication by said communication unit to switch to the switching candidate communication route
wherein said control unit performs control to extract roughly estimated communication routes for said communication unit to perform the wireless communication with the another communication apparatus, based on the shot image shot by said image pickup unit, and set the switching candidate communication route based on the roughly estimated communication routes.

2. The communication apparatus according to claim 1, wherein said control unit performs the control to set the switching candidate communication route, by detecting a transmission/reception direction in which the wireless communication of said communication unit is possible, based on the roughly estimated communication routes and updating the roughly estimated communication routes based on the detected transmission/reception direction.

3. The communication apparatus according to claim 1, further comprising a depth detecting unit configured to detect depth information about the surrounding environment,
wherein said control unit performs the control to extract the roughly estimated communication routes based on the shot image shot by said image pickup unit and the depth information detected by said depth detecting unit.

4. The communication apparatus according to claim 1, further comprising a reflection surface detecting unit configured to detect reflection surfaces where a signal of the wireless communication of said communication unit is reflected, based on the shot image shot by said image pickup unit,
wherein said control unit performs control to, based on the reflection surfaces detected by said reflection surface detecting unit, extract roughly estimated communication routes using the reflection surfaces.

5. The communication apparatus according to claim 4, wherein said reflection surface detecting unit evaluates the reflection surfaces based on the shot image shot by said image pickup unit, and
said control unit performs control to determine communication parameters for the roughly estimated communication routes using the reflection surfaces, based on the evaluation of the reflection surfaces by said reflection surface detecting unit.

6. The communication apparatus according to claim 4, wherein said reflection surface detecting unit detects at least any one of sizes or surface roughnesses of the reflection surfaces from the shot image shot by said image pickup unit, and
said control unit performs the control to determine the communication parameters for the roughly estimated communication routes using the reflection surfaces, based on the at least any one of the sizes or the surface roughnesses of the reflection surfaces detected by said reflection surface detecting unit.

7. The communication apparatus according to claim 1, wherein, when the switching candidate communication route comprises a plurality of switching candidate communication routes, said control unit performs control to set switching priorities for the switching candidate communication routes.

8. The communication apparatus according to claim 1, wherein said control unit performs control to set the switching candidate communication route if it is judged, based on the shot image shot by said image pickup unit, that there is a predetermined amount or more of change in the surrounding environment.

9. The communication apparatus according to claim 1, wherein said control unit performs control to set the switching candidate communication route if the surrounding environment changes because of a change in at least any one of an attitude and a position of at least any one of the communication apparatus and the other communication apparatus.

10. The communication apparatus according to claim 1, wherein said control unit performs control to, in the case of switching the communication route for said communication unit to perform the wireless communication with the other communication apparatus from a first communication route to a second communication route, transmit a notification of switching the communication route to the other communication apparatus through the first communication route and receive a response to the notification of switching the communication route from the other communication apparatus through the first communication route.

11. The communication apparatus according to claim 1, wherein said control unit performs control to set a communication route via a relay apparatus as the switching candidate communication route to be set according to a change in the surrounding environment shot by said image pickup unit.

12. The communication apparatus according to claim 11, wherein said control unit performs control to switch from the communication route via the relay apparatus to a communication route not via the relay apparatus, or from the communication route not via the relay apparatus to the communication route via the relay apparatus, as the communication route of the communication apparatus based on the shot image shot by said image pickup unit.

13. The communication apparatus according to claim 10, wherein said image pickup unit shoots the surrounding environment including the first communication route and the second communication route.

14. A communication apparatus comprising:
a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication;
an image pickup unit configured to shoot a surrounding environment;
a control unit configured to, before a communication route through which said communication unit is performing the wireless communication with the another communication apparatus is blocked, set a switching candidate communication route based on a shot image of the surrounding environment shot by said image pickup unit, and, if the communication route through which said communication unit is performing the wireless communication with the another communication apparatus is blocked, control the directivity of the wireless communication by said communication unit to switch to the switching candidate communication route; and
a moving body detecting unit configured to detect a moving body based on the shot image shot by said image pickup unit,
wherein said control unit performs control to, in response to a moving body being detected to have exceeded a threshold area on the shot image by said moving body detecting unit when said communication unit is performing the wireless communication with the another wireless apparatus through a first communication route, switch to a second communication route different from the first communication route so that said communication unit performs the wireless communication with the another communication apparatus.

15. The communication apparatus according to claim 14, wherein said control unit performs control to change a size of the threshold area based on at least any one of a size, a movement speed of the moving body detected by said moving body detecting unit, a distance to the moving body, and an image pickup angle of view of said image pickup unit.

16. The communication apparatus according to claim 14, wherein said control unit performs control not to switch to the second communication route if it is judged, based on a movement direction and a position of the moving body detected by said moving body detecting unit, that the first communication route is not blocked.

17. A communication apparatus comprising:
a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication;
an image pickup unit configured to shoot a surrounding environment;
a control unit configured to, before a communication route through which said communication unit is performing the wireless communication with the another communication apparatus is blocked, set a switching candidate communication route based on a shot image of the surrounding environment shot by said image pickup unit, and, if the communication route through which said communication unit is performing the wireless communication with the another communication apparatus is blocked, control the directivity of the wireless communication by said communication unit to switch to the switching candidate communication route; and
a moving body detecting unit configured to detect a moving body based on the shot image shot by said image pickup unit,
wherein said control unit performs control to, in response to a moving body being detected to have exceeded a first threshold area on the shot image by said moving body detecting unit when said communication unit is performing the wireless communication with the other wireless apparatus through a first communication route, prepare for switching to a second communication route different from the first communication route and, in response to the moving body being detected to have exceeded a second threshold area smaller than the first threshold area on the shot image by said moving body detecting unit, switch to the second communication route so that said communication unit performs the wireless communication with the other communication apparatus.

18. A method for controlling a communication apparatus comprising a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication, the method comprising:
an image pickup step of shooting a surrounding environment; and
a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route;

wherein said control step performs control to extract roughly estimated communication routes for said communication unit to perform the wireless communication with the another communication apparatus, based on the shot image shot in said image pickup step, and set the switching candidate communication route based on the roughly estimated communication routes.

19. A non-transitory computer-readable storage medium storing a program causing a computer to execute a method for controlling a communication apparatus performing wireless communication with another communication apparatus by directional communication, the communication apparatus comprising communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication, the method comprising:

an image pickup step of shooting a surrounding environment; and a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route;

wherein said control step performs control to extract roughly estimated communication routes for said communication unit to perform the wireless communication with the another communication apparatus, based on the shot image shot in said image pickup step, and set the switching candidate communication route based on the roughly estimated communication routes.

20. A method for controlling a communication apparatus comprising a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication, the method comprising:

an image pickup step of shooting a surrounding environment;

a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route; and a moving body detecting step of detecting a moving body based on the shot image shot in said image pickup step, wherein said control step performs control to, in response to a moving body being detected to have exceeded a threshold area on the shot image in said moving body detecting step when said communication unit is performing the wireless communication with the another wireless apparatus through a first communication route, switch to a second communication route different from the first communication route so that said communication unit performs the wireless communication with the another communication apparatus.

21. A non-transitory computer-readable storage medium storing a program causing a computer to execute a method for controlling a communication apparatus comprising a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication, the method comprising:

an image pickup step of shooting a surrounding environment;

a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route; and a moving body detecting step of detecting a moving body based on the shot image shot in said image pickup step, wherein said control step performs control to, in response to a moving body being detected to have exceeded a threshold area on the shot image in said moving body detecting step when said communication unit is performing the wireless communication with the another wireless apparatus through a first communication route, switch to a second communication route different from the first communication route so that said communication unit performs the wireless communication with the another communication apparatus.

22. A method for controlling a communication apparatus comprising a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication, the method comprising:

an image pickup step of shooting a surrounding environment;

a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route; and a moving body detecting step of detecting a moving body based on the shot image shot in said image pickup step, wherein said control step performs control to, in response to a moving body being detected to have exceeded a first threshold area on the shot image in said moving body detecting step when said communication unit is performing the wireless communication with the other wireless apparatus through a first communication route, prepare for switching to a second communication route different from the first communication route and, in response to the moving body being detected to have exceeded a second threshold area smaller than the first threshold area on the shot image in said moving body detecting step, switch to the second communication route so that said communication unit performs the wireless communication with the other communication apparatus.

23. A non-transitory computer-readable storage medium storing a program causing a computer to execute a method for controlling a communication apparatus comprising a communication unit having a plurality of antenna elements and configured to perform wireless communication with another communication apparatus by directional communication, the communication unit being capable of, by changing phases or strengths of signals outputted from the plurality of antenna elements, controlling directivity of the wireless communication the method comprising:

an image pickup step of shooting a surrounding environment;

a control step of, before a communication route through which said communication unit is performing the wireless communication with the another communication apparatus is blocked, setting a switching candidate communication route based on a shot image of the surrounding environment shot by said image pickup step, and, if the communication route through which said communication unit is performing the wireless communication with the another communication apparatus is blocked, controlling the directivity of the wireless communication by said communication unit to switch to the switching candidate communication route; and a moving body detecting step of detecting a moving body based on the shot image shot in said image pickup step, wherein said control step performs control to, in response to a moving body being detected to have exceeded a first threshold area on the shot image in said moving body detecting step when said communication unit is performing the wireless communication with the other wireless apparatus through a first communication route, prepare for switching to a second communication route different from the first communication route and, in response to the moving body being detected to have exceeded a second threshold area smaller than the first threshold area on the shot image in said moving body detecting step, switch to the second communication route so that said communication unit performs the wireless communication with the other communication apparatus.

* * * * *